United States Patent
Bothe et al.

(10) Patent No.: US 9,005,700 B2
(45) Date of Patent: Apr. 14, 2015

(54) METHOD FOR MAKING UV-ABSORBING OPHTHALMIC LENSES

(71) Applicant: Novartis AG, Basel (CH)

(72) Inventors: Harald Bothe, Wiesbaden (DE); Yongxing Qiu, Duluth, GA (US); Peter Hagmann, Erlenbach am Main (DE)

(73) Assignee: Novartis AG, Basel (CH)

( * ) Notice: Subject to any disclaimer, the term of this patent is extended or adjusted under 35 U.S.C. 154(b) by 10 days.

(21) Appl. No.: 13/648,522

(22) Filed: Oct. 10, 2012

(65) Prior Publication Data

US 2013/0095235 A1  Apr. 18, 2013

Related U.S. Application Data

(60) Provisional application No. 61/546,092, filed on Oct. 12, 2011.

(51) Int. Cl.
| | | |
|---|---|---|
| *B05D 5/06* | (2006.01) | |
| *B29D 11/00* | (2006.01) | |
| *G02B 1/04* | (2006.01) | |

(52) U.S. Cl.
CPC ............ *B05D 5/06* (2013.01); *B29D 11/00865* (2013.01); *G02B 1/043* (2013.01); *B29D 11/00125* (2013.01); *B29D 11/00634* (2013.01)

(58) Field of Classification Search
CPC ...... B05D 1/18; B05D 5/06; B29D 11/00865; G02B 1/043
USPC .................................................. 427/160–169
See application file for complete search history.

(56) References Cited

U.S. PATENT DOCUMENTS

| | | | |
|---|---|---|---|
| 2,296,891 | A | 9/1942 | Andersen |
| 2,926,154 | A | 2/1960 | Keim |
| 3,162,676 | A | 12/1964 | Goldberg |
| 3,224,986 | A | 12/1965 | Butler |
| 3,299,173 | A | 1/1967 | Roselli |
| 3,399,173 | A | 8/1968 | Heller |
| 3,408,429 | A | 10/1968 | Wichterle |
| 3,434,984 | A | 3/1969 | Hyland, Jr. |
| 3,488,327 | A | 1/1970 | Kollinsky |
| 3,566,874 | A | 3/1971 | Shepherd |

(Continued)

FOREIGN PATENT DOCUMENTS

| | | |
|---|---|---|
| EP | 0032443 A2 | 7/1981 |
| EP | 0138385 A2 | 4/1985 |

(Continued)

OTHER PUBLICATIONS machine translation JP 2005-206720.*

(Continued)

*Primary Examiner* — Elizabeth Burkhart
(74) *Attorney, Agent, or Firm* — Jian Zhou

(57) ABSTRACT

Described herein is a cost-effective and time-efficient method for making UV-absorbing contact lenses. In contrast to the conventional method for making UV-absorbing contact lenses which involves copolymerizing a lens forming composition including a UV-absorbing vinylic monomer, a method of the invention involves dipping a contact lens in a solution of UV-absorbing polymer comprising carboxyl-containing monomeric units and UV-absorbing monomeric units to form a UV-absorbing coating on the contact lens.

20 Claims, 2 Drawing Sheets

(56) References Cited

U.S. PATENT DOCUMENTS

| | | |
|---|---|---|
| 3,583,950 A | 6/1971 | Kollinsky |
| 3,598,790 A | 8/1971 | Kollinsky |
| 3,609,126 A | 9/1971 | Asao |
| 3,616,935 A | 11/1971 | Love |
| 3,617,344 A | 11/1971 | Leininger |
| 3,634,123 A | 1/1972 | Eriksson |
| 3,639,141 A | 2/1972 | Dyck |
| 3,663,288 A | 5/1972 | Miller |
| 3,695,921 A | 10/1972 | Shepherd |
| 3,700,623 A | 10/1972 | Keim |
| 3,717,502 A | 2/1973 | Masuhara |
| 3,772,076 A | 11/1973 | Keim |
| 3,813,695 A | 6/1974 | Podell, Jr. |
| 3,844,989 A | 10/1974 | Harumiya |
| 3,861,396 A | 1/1975 | Vaillancourt |
| 3,895,166 A | 7/1975 | Wood |
| 3,900,672 A | 8/1975 | Hammond |
| 3,925,178 A | 12/1975 | Gesser |
| 3,974,131 A | 8/1976 | Puskas |
| 3,975,350 A | 8/1976 | Hudgin |
| 4,060,657 A | 11/1977 | Iwami |
| 4,118,485 A | 10/1978 | Eriksson |
| 4,132,695 A | 1/1979 | Burkholder |
| 4,136,250 A | 1/1979 | Mueller |
| 4,143,949 A | 3/1979 | Chen |
| 4,153,641 A | 5/1979 | Deichert |
| 4,154,898 A | 5/1979 | Burkholder, Jr. |
| 4,168,112 A | 9/1979 | Ellis |
| 4,182,822 A | 1/1980 | Chang |
| 4,189,546 A | 2/1980 | Deichert |
| 4,191,596 A | 3/1980 | Dollman |
| 4,217,038 A | 8/1980 | Letter |
| 4,229,838 A | 10/1980 | Mano |
| 4,254,248 A | 3/1981 | Friends |
| 4,259,467 A | 3/1981 | Keogh |
| 4,260,725 A | 4/1981 | Keogh |
| 4,261,875 A | 4/1981 | LeBoeuf |
| 4,263,188 A | 4/1981 | Hampton |
| 4,276,402 A | 6/1981 | Chromecek |
| 4,280,970 A | 7/1981 | Kesting |
| 4,293,642 A | 10/1981 | Beavan |
| 4,298,639 A | 11/1981 | Van Eenam |
| 4,298,715 A | 11/1981 | Van Eenam |
| 4,304,895 A | 12/1981 | Loshaek |
| 4,312,575 A | 1/1982 | Peyman |
| 4,321,261 A | 3/1982 | Ellis |
| 4,327,203 A | 4/1982 | Deichert |
| 4,341,889 A | 7/1982 | Deichert |
| 4,343,927 A | 8/1982 | Chang |
| 4,347,198 A | 8/1982 | Ohkada |
| 4,355,147 A | 10/1982 | Deichert |
| 4,373,009 A | 2/1983 | Winn |
| 4,379,893 A | 4/1983 | O'Malley |
| 4,427,823 A | 1/1984 | Inagaki |
| 4,444,711 A | 4/1984 | Schad |
| 4,450,045 A | 5/1984 | Hertel |
| 4,460,534 A | 7/1984 | Boehm |
| 4,462,665 A | 7/1984 | Shah |
| 4,485,236 A | 11/1984 | Rasmussen |
| 4,486,577 A | 12/1984 | Mueller |
| 4,487,808 A | 12/1984 | Lambert |
| 4,495,313 A | 1/1985 | Larsen |
| 4,499,154 A | 2/1985 | James |
| 4,521,564 A | 6/1985 | Solomon |
| 4,527,293 A | 7/1985 | Eckstein |
| 4,528,311 A | 7/1985 | Beard |
| 4,543,398 A | 9/1985 | Bany |
| 4,546,123 A | 10/1985 | Schäfer |
| 4,548,844 A | 10/1985 | Podell |
| 4,565,740 A | 1/1986 | Gölander |
| 4,575,476 A | 3/1986 | Podell |
| 4,605,712 A | 8/1986 | Mueller |
| 4,612,358 A | 9/1986 | Besecke |
| 4,613,665 A | 9/1986 | Larm |
| 4,661,575 A | 4/1987 | Tom |
| 4,684,538 A | 8/1987 | Klemarczyk |
| 4,703,097 A | 10/1987 | Wingler |
| 4,716,234 A | 12/1987 | Dunks |
| 4,720,512 A | 1/1988 | Hu |
| 4,734,475 A | 3/1988 | Goldenberg |
| 4,786,556 A | 11/1988 | Hu |
| 4,791,175 A | 12/1988 | Janssen |
| 4,833,218 A | 5/1989 | Lee |
| 4,837,289 A | 6/1989 | Mueller |
| 4,876,126 A | 10/1989 | Takemura |
| 4,892,402 A | 1/1990 | Sawamoto |
| 4,895,896 A | 1/1990 | Muller-Lierheim |
| 4,920,184 A | 4/1990 | Schäfer |
| 4,941,997 A | 7/1990 | Decher |
| 4,943,460 A | 7/1990 | Markle |
| 4,954,586 A | 9/1990 | Toyoshima |
| 4,954,587 A | 9/1990 | Mueller |
| 4,959,074 A | 9/1990 | Halpern |
| 4,968,532 A | 11/1990 | Janssen |
| 4,973,359 A | 11/1990 | Yamasoe |
| 4,973,429 A | 11/1990 | Decher |
| 4,973,493 A | 11/1990 | Guire |
| RE33,477 E | 12/1990 | Loshaek |
| 4,978,481 A | 12/1990 | Janssen |
| 4,979,959 A | 12/1990 | Guire |
| 4,985,559 A | 1/1991 | Goldberg |
| 4,990,357 A | 2/1991 | Karakelle |
| 5,002,582 A | 3/1991 | Guire |
| 5,010,141 A | 4/1991 | Mueller |
| 5,019,393 A | 5/1991 | Ito |
| 5,034,461 A | 7/1991 | Lai |
| 5,039,459 A | 8/1991 | Kindt-Larsen |
| 5,039,761 A | 8/1991 | Ono |
| 5,049,403 A | 9/1991 | Larm |
| 5,053,048 A | 10/1991 | Pinchuk |
| 5,061,738 A | 10/1991 | Solomon |
| 5,068,318 A | 11/1991 | Decher |
| 5,070,170 A | 12/1991 | Robertson |
| 5,079,093 A | 1/1992 | Akashi |
| 5,079,319 A | 1/1992 | Mueller |
| 5,080,924 A | 1/1992 | Kamel |
| 5,091,205 A | 2/1992 | Fan |
| 5,108,776 A | 4/1992 | Goldberg |
| 5,112,900 A | 5/1992 | Buddenhagen |
| 5,132,108 A | 7/1992 | Narayanan |
| 5,135,297 A | 8/1992 | Valint, Jr. |
| 5,135,516 A | 8/1992 | Sahatjian |
| 5,155,194 A | 10/1992 | Kossmehl |
| 5,160,790 A | 11/1992 | Elton |
| 5,165,919 A | 11/1992 | Sasaki |
| 5,194,544 A | 3/1993 | Goldberg |
| 5,208,111 A | 5/1993 | Decher |
| 5,210,111 A | 5/1993 | Goldenberg |
| 5,214,452 A | 5/1993 | Kossmehl |
| 5,217,492 A | 6/1993 | Guire |
| 5,229,211 A | 7/1993 | Murayama |
| 5,262,484 A | 11/1993 | Coleman |
| 5,263,992 A | 11/1993 | Guire |
| 5,270,046 A | 12/1993 | Sakamoto |
| 5,272,012 A | 12/1993 | Opolski |
| 5,290,548 A | 3/1994 | Goldberg |
| 5,290,585 A | 3/1994 | Elton |
| 5,292,514 A | 3/1994 | Capecchi |
| 5,308,641 A | 5/1994 | Cahalan |
| 5,312,873 A | 5/1994 | Gregor |
| 5,336,797 A | 8/1994 | McGee |
| 5,346,946 A | 9/1994 | Yokoyama |
| 5,348,873 A | 9/1994 | Matsuda |
| 5,350,800 A | 9/1994 | Verhoeven |
| 5,352,714 A | 10/1994 | Lai |
| 5,355,213 A | 10/1994 | Dotan |
| 5,358,995 A | 10/1994 | Lai |
| 5,387,632 A | 2/1995 | Lai |
| 5,397,848 A | 3/1995 | Yang |
| 5,407,715 A | 4/1995 | Buddenhagen |
| 5,408,002 A | 4/1995 | Coleman |
| 5,408,280 A | 4/1995 | von der Haegen |
| 5,409,731 A | 4/1995 | Nakagawa |
| 5,416,131 A | 5/1995 | Wolff |

(56) References Cited

U.S. PATENT DOCUMENTS

| | | |
|---|---|---|
| 5,416,132 A | 5/1995 | Yokoyama |
| 5,417,969 A | 5/1995 | Hsu |
| 5,441,488 A | 8/1995 | Shimura |
| 5,442,402 A | 8/1995 | Sohn |
| 5,443,907 A | 8/1995 | Slaikeu |
| 5,451,617 A | 9/1995 | Lai |
| 5,461,433 A | 10/1995 | Nakabayashi |
| 5,470,944 A | 11/1995 | Bonsignore |
| 5,475,450 A | 12/1995 | Meadows |
| 5,476,665 A | 12/1995 | Dennison |
| 5,486,579 A | 1/1996 | Lai |
| 5,500,732 A | 3/1996 | Ebel |
| 5,508,317 A | 4/1996 | Müller |
| 5,509,899 A | 4/1996 | Fan |
| 5,510,004 A | 4/1996 | Allen |
| 5,510,418 A | 4/1996 | Rhee |
| 5,518,767 A | 5/1996 | Rubner |
| 5,527,925 A | 6/1996 | Chabrecek |
| 5,528,357 A | 6/1996 | Davis |
| 5,529,727 A | 6/1996 | LaBombard |
| 5,532,311 A | 7/1996 | Sirvio |
| 5,536,573 A | 7/1996 | Rubner |
| 5,562,922 A | 10/1996 | Lambert |
| 5,563,056 A | 10/1996 | Swan |
| 5,574,554 A | 11/1996 | Su |
| 5,578,675 A | 11/1996 | Mormile |
| 5,583,163 A | 12/1996 | Müller |
| 5,584,882 A | 12/1996 | Yabushita |
| 5,591,140 A | 1/1997 | Narayanan |
| 5,597,873 A | 1/1997 | Chambers |
| 5,599,576 A | 2/1997 | Opolski |
| 5,612,389 A | 3/1997 | Chabrecek |
| 5,612,391 A | 3/1997 | Chabrecek |
| 5,614,035 A | 3/1997 | Nadkarni |
| 5,620,738 A | 4/1997 | Fan |
| 5,621,018 A | 4/1997 | Chabrecek |
| 5,626,000 A | 5/1997 | Edwards |
| 5,633,504 A | 5/1997 | Collins |
| 5,637,726 A | 6/1997 | Collins |
| 5,648,442 A | 7/1997 | Bowers |
| 5,670,558 A | 9/1997 | Onishi |
| 5,672,638 A | 9/1997 | Verhoeven |
| 5,674,942 A | 10/1997 | Hill |
| 5,681,510 A | 10/1997 | Valint, Jr. |
| 5,688,855 A | 11/1997 | Stoy |
| 5,693,034 A | 12/1997 | Buscemi |
| 5,700,559 A | 12/1997 | Sheu |
| 5,702,754 A | 12/1997 | Zhong |
| 5,705,583 A | 1/1998 | Bowers |
| 5,710,302 A | 1/1998 | Kunzler |
| 5,712,326 A | 1/1998 | Jones |
| 5,712,327 A | 1/1998 | Chang |
| 5,712,356 A | 1/1998 | Bothe |
| 5,717,781 A | 2/1998 | Ebel |
| 5,719,669 A | 2/1998 | Ross, III |
| 5,723,145 A | 3/1998 | Shikinami |
| 5,731,087 A | 3/1998 | Fan |
| 5,739,236 A | 4/1998 | Bowers |
| 5,748,300 A | 5/1998 | Wilder |
| 5,760,100 A | 6/1998 | Nicolson |
| 5,766,158 A | 6/1998 | Opolski |
| 5,776,999 A | 7/1998 | Nicolson |
| 5,779,943 A | 7/1998 | Enns |
| 5,783,650 A | 7/1998 | Bowers |
| 5,789,461 A | 8/1998 | Nicolson |
| 5,789,462 A | 8/1998 | Motani |
| 5,789,464 A | 8/1998 | Müller |
| 5,792,531 A | 8/1998 | Littleton |
| 5,800,412 A | 9/1998 | Zhang |
| 5,801,822 A | 9/1998 | Lafferty |
| 5,804,318 A | 9/1998 | Pinchuk |
| 5,805,264 A | 9/1998 | Janssen |
| 5,805,276 A | 9/1998 | Davis |
| 5,807,636 A | 9/1998 | Sheu |
| 5,807,944 A | 9/1998 | Hirt |
| 5,811,151 A | 9/1998 | Hendriks |
| 5,818,573 A | 10/1998 | Lafferty |
| 5,828,446 A | 10/1998 | Davis |
| 5,843,346 A | 12/1998 | Morrill |
| 5,849,810 A | 12/1998 | Muller |
| 5,849,811 A | 12/1998 | Nicolson |
| 5,855,825 A | 1/1999 | Ito |
| 5,858,653 A | 1/1999 | Duran |
| 5,859,107 A | 1/1999 | Jones |
| 5,866,113 A | 2/1999 | Hendriks |
| 5,869,127 A | 2/1999 | Zhong |
| 5,871,823 A | 2/1999 | Anders |
| 5,874,500 A | 2/1999 | Rhee |
| 5,879,436 A | 3/1999 | Kramer |
| 5,879,697 A | 3/1999 | Ding |
| 5,882,687 A | 3/1999 | Park |
| 5,885,647 A | 3/1999 | Larm |
| 5,894,002 A | 4/1999 | Boneberger |
| 5,910,518 A | 6/1999 | Nakada |
| 5,922,161 A | 7/1999 | Wu |
| 5,922,249 A | 7/1999 | Ajello |
| 5,936,052 A | 8/1999 | Bothe |
| 5,936,703 A | 8/1999 | Miyazaki |
| 5,945,498 A | 8/1999 | Höpken |
| 5,962,548 A | 10/1999 | Vanderlaan |
| 5,965,631 A | 10/1999 | Nicolson |
| 5,981,615 A | 11/1999 | Meijs |
| 5,981,675 A | 11/1999 | Valint, Jr. |
| 5,995,213 A | 11/1999 | Davis |
| 5,997,517 A | 12/1999 | Whitbourne |
| 6,007,526 A | 12/1999 | Passalaqua |
| 6,011,082 A | 1/2000 | Wang |
| 6,013,106 A | 1/2000 | Tweden |
| 6,018,001 A | 1/2000 | Hiratani |
| 6,020,175 A | 2/2000 | Onda |
| 6,036,891 A * | 3/2000 | Liao et al. .................. 252/588 |
| 6,039,913 A | 3/2000 | Hirt |
| 6,043,328 A | 3/2000 | Domschke |
| 6,048,620 A | 4/2000 | Zhong |
| 6,050,980 A | 4/2000 | Wilson |
| 6,054,504 A | 4/2000 | Dalla Riva Toma |
| 6,063,484 A | 5/2000 | Exsted |
| 6,087,415 A | 7/2000 | Vanderlaan |
| 6,087,462 A | 7/2000 | Bowers |
| 6,090,901 A | 7/2000 | Bowers |
| 6,096,138 A | 8/2000 | Heiler |
| 6,096,726 A | 8/2000 | Opolski |
| 6,099,122 A | 8/2000 | Chabrecek |
| 6,099,852 A | 8/2000 | Jen |
| 6,106,889 A | 8/2000 | Beavers |
| 6,134,342 A | 10/2000 | Doke |
| 6,149,842 A | 11/2000 | Lally |
| 6,165,322 A | 12/2000 | Bower |
| 6,169,127 B1 | 1/2001 | Lohmann |
| 6,179,817 B1 | 1/2001 | Zhong |
| 6,193,369 B1 | 2/2001 | Valint, Jr. |
| 6,197,295 B1 | 3/2001 | Hsia |
| 6,218,508 B1 | 4/2001 | Kragh |
| 6,221,061 B1 | 4/2001 | Englelson |
| 6,225,431 B1 | 5/2001 | Bowers |
| 6,238,799 B1 | 5/2001 | Opolski |
| 6,244,707 B1 * | 6/2001 | Faubl .................. 351/159.33 |
| 6,248,127 B1 | 6/2001 | Shah |
| 6,284,854 B1 | 9/2001 | Bowers |
| 6,297,169 B1 | 10/2001 | Mangat |
| 6,301,005 B1 | 10/2001 | Epstein |
| 6,303,687 B1 | 10/2001 | Müller |
| 6,306,514 B1 | 10/2001 | Weikel |
| 6,314,199 B1 | 11/2001 | Höfer |
| 6,316,057 B1 | 11/2001 | Hirayama |
| 6,323,165 B1 | 11/2001 | Heiler |
| 6,340,465 B1 | 1/2002 | Hsu |
| 6,340,746 B1 | 1/2002 | Roberts |
| 6,342,570 B1 | 1/2002 | Bothe |
| 6,346,170 B1 | 2/2002 | Bower |
| 6,348,507 B1 | 2/2002 | Heiler |
| 6,350,777 B2 | 2/2002 | Pinney |
| 6,364,934 B1 | 4/2002 | Nandu |
| 6,367,929 B1 | 4/2002 | Maiden |

(56) References Cited

U.S. PATENT DOCUMENTS

| | | |
|---|---|---|
| 6,368,643 B1 | 4/2002 | Fan |
| 6,407,083 B1 | 6/2002 | Xu |
| 6,410,616 B1 | 6/2002 | Harada |
| 6,423,744 B2 | 7/2002 | Moran |
| 6,428,839 B1 | 8/2002 | Künzler |
| 6,436,481 B1 | 8/2002 | Chabrecek |
| 6,440,366 B1 | 8/2002 | Salpekar |
| 6,440,464 B1 | 8/2002 | Hsia |
| 6,440,571 B1 | 8/2002 | Valint, Jr. |
| 6,447,920 B1 | 9/2002 | Chabrecek |
| 6,451,871 B1 | 9/2002 | Winterton |
| 6,465,056 B1 | 10/2002 | Chabrecek |
| 6,465,602 B2 | 10/2002 | Schroeder |
| 6,478,423 B1 | 11/2002 | Turner |
| 6,479,227 B1 | 11/2002 | Kubo |
| 6,482,221 B1 | 11/2002 | Hebert |
| 6,482,311 B1 | 11/2002 | Wickham |
| 6,495,653 B1 | 12/2002 | Kinsho |
| 6,500,481 B1 | 12/2002 | Vanderlaan |
| 6,517,678 B1 | 2/2003 | Shannon |
| 6,521,352 B1 | 2/2003 | Chabrecek |
| 6,525,040 B1 | 2/2003 | Erdelmeier |
| 6,531,432 B2 | 3/2003 | Molock |
| 6,534,559 B1 | 3/2003 | Vanderlaan |
| 6,537,614 B1 | 3/2003 | Wei |
| 6,551,267 B1 | 4/2003 | Cohen |
| 6,586,038 B1 | 7/2003 | Chabrecek |
| 6,586,520 B1 | 7/2003 | Canorro |
| 6,589,665 B2 | 7/2003 | Chabrecek |
| 6,596,294 B2 | 7/2003 | Lai |
| 6,599,559 B1 | 7/2003 | McGee |
| 6,602,930 B2 | 8/2003 | Imafuku |
| 6,614,516 B2 | 9/2003 | Epstein |
| 6,623,747 B1 | 9/2003 | Chatelier |
| 6,627,124 B1 | 9/2003 | Herbrechtsmeier |
| 6,630,243 B2 | 10/2003 | Valint, Jr. |
| 6,638,563 B2 | 10/2003 | McGee |
| 6,673,447 B2 | 1/2004 | Wei |
| 6,683,062 B2 | 1/2004 | Opolski |
| 6,686,054 B2 | 2/2004 | Nigam |
| 6,689,480 B2 | 2/2004 | Shimoyama |
| 6,699,435 B2 | 3/2004 | Salpekar |
| 6,719,929 B2 | 4/2004 | Winterton |
| 6,730,366 B2 | 5/2004 | Lohmann |
| 6,733,123 B2 | 5/2004 | Polzhofer |
| 6,734,321 B2 | 5/2004 | Chabrecek |
| 6,740,336 B2 | 5/2004 | Trubetskoy |
| 6,743,878 B2 | 6/2004 | Bowers et al. |
| 6,762,264 B2 | 7/2004 | Künzler |
| 6,793,973 B2 | 9/2004 | Winterton |
| 6,794,456 B2 | 9/2004 | Grobe, III |
| 6,800,225 B1 | 10/2004 | Hagmann |
| 6,811,805 B2 | 11/2004 | Gilliard |
| 6,822,016 B2 | 11/2004 | McCabe |
| 6,835,410 B2 | 12/2004 | Chabrecek |
| 6,838,491 B1 | 1/2005 | Vanderlaan |
| 6,858,310 B2 | 2/2005 | McGee |
| 6,866,936 B2 | 3/2005 | Opolski |
| 6,866,938 B2 | 3/2005 | Mori |
| 6,867,245 B2 | 3/2005 | Iwata |
| 6,878,399 B2 | 4/2005 | Chabrecek |
| 6,884,457 B2 | 4/2005 | Gilliard |
| 6,891,010 B2 | 5/2005 | Kunzler |
| 6,896,926 B2 | 5/2005 | Qiu |
| 6,902,812 B2 | 6/2005 | Valint, Jr. |
| 6,921,802 B2 | 7/2005 | Künzler |
| 6,923,538 B2 | 8/2005 | Dean |
| 6,923,978 B2 | 8/2005 | Chatelier |
| 6,926,965 B2 | 8/2005 | Qiu |
| 6,936,641 B2 | 8/2005 | Molock |
| 6,940,580 B2 | 9/2005 | Winterton |
| 6,951,894 B1 | 10/2005 | Nicolson |
| 7,018,688 B2 | 3/2006 | Shepherd |
| 7,032,251 B2 | 4/2006 | Janssen |
| 7,052,131 B2 | 5/2006 | McCabe |
| 7,091,283 B2 | 8/2006 | Müller |
| 7,160,953 B2 | 1/2007 | Bowers |
| 7,238,750 B2 | 7/2007 | Müller |
| 7,247,692 B2 | 7/2007 | Laredo |
| 7,249,848 B2 | 7/2007 | Laredo |
| 7,268,189 B2 | 9/2007 | Müller |
| 7,268,198 B2 | 9/2007 | Kunzler |
| 7,270,678 B2 | 9/2007 | Valint, Jr. |
| 7,297,725 B2 | 11/2007 | Winterton |
| 7,344,607 B2 | 3/2008 | Melzer |
| 7,360,890 B2 | 4/2008 | Back |
| 7,364,723 B1 | 4/2008 | Nakada |
| 7,384,590 B2 | 6/2008 | Kelly |
| 7,387,759 B2 | 6/2008 | Kelly |
| 7,396,890 B2 | 7/2008 | Zanini |
| 7,399,795 B2 | 7/2008 | Lai |
| 7,423,074 B2 | 9/2008 | Lai |
| 7,426,993 B2 | 9/2008 | Coldrey |
| 7,428,029 B2 | 9/2008 | Murakami |
| 7,429,558 B2 | 9/2008 | Batchelor |
| 7,429,623 B2 | 9/2008 | Molock |
| 7,435,452 B2 | 10/2008 | Shimoyama |
| 7,452,377 B2 | 11/2008 | Watling |
| 7,468,398 B2 | 12/2008 | Nicolson |
| 7,521,519 B1 | 4/2009 | Hirt |
| 7,538,146 B2 | 5/2009 | Nicolson |
| 7,540,609 B2 | 6/2009 | Chen |
| 7,553,880 B2 | 6/2009 | Nicolson |
| 7,556,858 B2 | 7/2009 | Rasmussen |
| 7,572,841 B2 | 8/2009 | Chen |
| 7,588,334 B2 | 9/2009 | Matsushita |
| 7,632,876 B2 | 12/2009 | Lai |
| 7,691,917 B2 | 4/2010 | Lai |
| 7,726,809 B2 | 6/2010 | Filippo |
| 7,781,536 B2 | 8/2010 | Kamiya |
| 7,781,554 B2 | 8/2010 | Lai |
| 7,789,509 B2 | 9/2010 | Mentak |
| 7,832,856 B2 | 11/2010 | Vanderbilt |
| 7,841,716 B2 | 11/2010 | McCabe |
| 7,847,025 B2 | 12/2010 | Liu |
| 7,857,447 B2 | 12/2010 | Myung |
| 7,875,687 B2 | 1/2011 | Kunzler |
| 7,879,267 B2 | 2/2011 | Turner |
| 7,919,136 B2 | 4/2011 | Linhardt |
| 2001/0019762 A1 | 9/2001 | Nazarova |
| 2001/0025198 A1 | 9/2001 | Faubl |
| 2001/0031744 A1 | 10/2001 | Kosbab |
| 2001/0045676 A1 | 11/2001 | Winterton |
| 2001/0048975 A1 | 12/2001 | Winterton |
| 2002/0006493 A1 | 1/2002 | Chabrecek |
| 2002/0086160 A1 | 7/2002 | Qiu |
| 2002/0120084 A1 | 8/2002 | Valint, Jr. |
| 2002/0128161 A1 | 9/2002 | Wickham |
| 2002/0165215 A1 | 11/2002 | Lam |
| 2002/0182315 A1 | 12/2002 | Heiler |
| 2002/0182316 A1 | 12/2002 | Gilliard |
| 2002/0190759 A1 | 12/2002 | Tour |
| 2002/0197304 A1 | 12/2002 | Schrauzer |
| 2003/0008154 A1 | 1/2003 | Aguado |
| 2003/0012872 A1 | 1/2003 | Qiu |
| 2003/0039742 A1 | 2/2003 | Qiu |
| 2003/0039748 A1 | 2/2003 | Valint, Jr. |
| 2003/0052424 A1 | 3/2003 | Turner |
| 2003/0083383 A1 | 5/2003 | Spallholz |
| 2003/0117579 A1 | 6/2003 | Morris |
| 2003/0125498 A1 | 7/2003 | McCabe |
| 2003/0134132 A1 | 7/2003 | Winterton |
| 2003/0143335 A1 | 7/2003 | Qiu |
| 2003/0162862 A1 | 8/2003 | McCabe |
| 2003/0186825 A1 | 10/2003 | Mitani |
| 2004/0018295 A1 | 1/2004 | Qiu |
| 2004/0047979 A1 | 3/2004 | Qiu |
| 2004/0067365 A1 | 4/2004 | Qiu |
| 2004/0108607 A1 | 6/2004 | Winterton |
| 2004/0116564 A1 | 6/2004 | Devlin |
| 2004/0170752 A1 | 9/2004 | Luthra |
| 2005/0060812 A1 | 3/2005 | Batchelor |
| 2005/0228065 A1 | 10/2005 | Nicolson |
| 2006/0063852 A1 | 3/2006 | Iwata |

(56) References Cited

U.S. PATENT DOCUMENTS

| | | | |
|---|---|---|---|
| 2006/0100113 A1 | 5/2006 | Pegram | |
| 2006/0142410 A1 | 6/2006 | Baba | |
| 2006/0217276 A1 | 9/2006 | Mitani | |
| 2007/0066706 A1 | 3/2007 | Manesis | |
| 2007/0092831 A1* | 4/2007 | Lai et al. | 430/270.1 |
| 2007/0105973 A1 | 5/2007 | Nicolson | |
| 2007/0105974 A1 | 5/2007 | Nicolson | |
| 2007/0122540 A1 | 5/2007 | Salamone | |
| 2007/0149428 A1 | 6/2007 | Ammon, Jr. | |
| 2007/0185281 A1 | 8/2007 | Song | |
| 2007/0229758 A1 | 10/2007 | Matsuzawa | |
| 2007/0255014 A1 | 11/2007 | Salamone | |
| 2007/0296914 A1 | 12/2007 | Hong | |
| 2008/0003259 A1 | 1/2008 | Salamone | |
| 2008/0015315 A1 | 1/2008 | Chang | |
| 2008/0017525 A1 | 1/2008 | Newman | |
| 2008/0100796 A1 | 5/2008 | Pruitt | |
| 2008/0110770 A1 | 5/2008 | Burke | |
| 2008/0138310 A1 | 6/2008 | Ketelson | |
| 2008/0142038 A1 | 6/2008 | Kunzler | |
| 2008/0143003 A1 | 6/2008 | Phelan | |
| 2008/0143957 A1 | 6/2008 | Linhardt | |
| 2008/0143958 A1 | 6/2008 | Medina | |
| 2008/0148689 A1 | 6/2008 | Xia | |
| 2008/0152540 A1 | 6/2008 | Schorzman | |
| 2008/0152800 A1 | 6/2008 | Bothe | |
| 2008/0170201 A1 | 7/2008 | Filippo | |
| 2008/0174035 A1 | 7/2008 | Winterton | |
| 2008/0226922 A1 | 9/2008 | Ferreiro | |
| 2008/0231798 A1 | 9/2008 | Zhou | |
| 2008/0234457 A1 | 9/2008 | Zhou | |
| 2008/0273168 A1 | 11/2008 | Rathore | |
| 2008/0275156 A1 | 11/2008 | Laredo | |
| 2008/0306455 A1 | 12/2008 | Dias | |
| 2008/0307751 A1 | 12/2008 | Newman | |
| 2008/0314767 A1 | 12/2008 | Lai | |
| 2009/0036577 A1 | 2/2009 | Luo | |
| 2009/0039535 A1 | 2/2009 | Nicolson | |
| 2009/0046242 A1 | 2/2009 | Nicolson | |
| 2009/0100801 A1 | 4/2009 | Zhao | |
| 2009/0111942 A1 | 4/2009 | Lang | |
| 2009/0141234 A1 | 6/2009 | Blackwell | |
| 2009/0142485 A1* | 6/2009 | Lai et al. | 427/162 |
| 2009/0142508 A1 | 6/2009 | Lai | |
| 2009/0145086 A1 | 6/2009 | Reynolds | |
| 2009/0145091 A1 | 6/2009 | Connolly | |
| 2009/0168012 A1 | 7/2009 | Linhardt | |
| 2009/0169716 A1 | 7/2009 | Linhardt | |
| 2009/0171027 A1 | 7/2009 | Linhardt | |
| 2009/0171049 A1 | 7/2009 | Linhardt | |
| 2009/0171050 A1 | 7/2009 | Linhardt | |
| 2009/0171459 A1 | 7/2009 | Linhardt | |
| 2009/0173044 A1 | 7/2009 | Linhardt | |
| 2009/0173045 A1 | 7/2009 | Lai | |
| 2009/0173643 A1 | 7/2009 | Lai | |
| 2009/0182067 A1 | 7/2009 | Liu | |
| 2009/0186229 A1 | 7/2009 | Muller | |
| 2009/0264553 A1 | 10/2009 | Chen | |
| 2009/0280157 A1 | 11/2009 | Maas | |
| 2010/0029802 A1 | 2/2010 | Mehrabi | |
| 2010/0041787 A1* | 2/2010 | Chen | 523/106 |
| 2010/0048847 A1 | 2/2010 | Broad | |
| 2010/0084775 A1 | 4/2010 | McCabe | |
| 2010/0118261 A1 | 5/2010 | McGee | |
| 2010/0127219 A1 | 5/2010 | Mohamed | |
| 2010/0152084 A1 | 6/2010 | Rathore | |
| 2010/0162661 A1 | 7/2010 | Vanderbilt | |
| 2010/0162663 A1 | 7/2010 | McGee | |
| 2010/0225881 A1 | 9/2010 | Filippo | |
| 2010/0238398 A1 | 9/2010 | Nicolson | |
| 2010/0240776 A1 | 9/2010 | Filippo | |
| 2010/0249356 A1 | 9/2010 | Rathore | |
| 2010/0296049 A1 | 11/2010 | Justynska | |
| 2010/0298446 A1 | 11/2010 | Chang | |
| 2010/0300902 A1 | 12/2010 | Marmo | |
| 2011/0009519 A1 | 1/2011 | Awasthi | |
| 2011/0009587 A1 | 1/2011 | Awasthi | |
| 2011/0015298 A1 | 1/2011 | Schorzman | |
| 2011/0102736 A1 | 5/2011 | Wu | |
| 2011/0134387 A1* | 6/2011 | Samuel et al. | 351/160 H |

FOREIGN PATENT DOCUMENTS

| | | | |
|---|---|---|---|
| EP | 0321403 A2 | 6/1989 | |
| EP | 0362137 A2 | 4/1990 | |
| EP | 0362145 A2 | 4/1990 | |
| EP | 0393532 A2 | 10/1990 | |
| EP | 0455323 A2 | 11/1991 | |
| EP | 0480809 A2 | 4/1992 | |
| EP | 0537972 A1 | 4/1993 | |
| EP | 0574352 A1 | 12/1993 | |
| EP | 0643083 A1 | 3/1995 | |
| EP | 0713106 A1 | 5/1996 | |
| EP | 0728487 A1 | 8/1996 | |
| EP | 0747071 A1 | 12/1996 | |
| EP | 0751407 A2 | 1/1997 | |
| EP | 0758687 A1 | 2/1997 | |
| EP | 0780419 A1 | 6/1997 | |
| EP | 0850924 A1 | 7/1998 | |
| EP | 0894504 A2 | 2/1999 | |
| EP | 0940447 A2 | 9/1999 | |
| EP | 0940693 A2 | 9/1999 | |
| EP | 0963761 A1 | 12/1999 | |
| EP | 0989418 A2 | 3/2000 | |
| EP | 0995762 A2 | 4/2000 | |
| EP | 1138385 A1 | 10/2001 | |
| EP | 1153964 A2 | 11/2001 | |
| EP | 1287060 B1 | 11/2005 | |
| EP | 1179190 B1 | 4/2006 | |
| EP | 1754731 A1 | 2/2007 | |
| GB | 2012070 A | 7/1979 | |
| JP | 2005-206720 | * 8/2005 | |
| WO | 8989246 A1 | 10/1989 | |
| WO | 9104283 A1 | 4/1991 | |
| WO | 9209650 A1 | 6/1992 | |
| WO | 9300391 A1 | 1/1993 | |
| WO | 9406485 A1 | 3/1994 | |
| WO | 9500618 A1 | 1/1995 | |
| WO | 9502251 A2 | 1/1995 | |
| WO | 9504609 A1 | 2/1995 | |
| WO | 9520407 A1 | 8/1995 | |
| WO | 9618498 A1 | 6/1996 | |
| WO | 9620796 A1 | 7/1996 | |
| WO | 9624392 A1 | 8/1996 | |
| WO | 9631792 A1 | 10/1996 | |
| WO | 9637241 A1 | 11/1996 | |
| WO | 9700274 A1 | 1/1997 | |
| WO | 9718904 A1 | 5/1997 | |
| WO | 9721497 A1 | 6/1997 | |
| WO | 9723532 A1 | 7/1997 | |
| WO | 9729160 A1 | 8/1997 | |
| WO | 9805269 A1 | 2/1998 | |
| WO | 9821270 A1 | 5/1998 | |
| WO | 9828026 A1 | 7/1998 | |
| WO | 9833089 A1 | 7/1998 | |
| WO | 9915917 A1 | 4/1999 | |
| WO | 9935520 A1 | 7/1999 | |
| WO | 9957581 A1 | 11/1999 | |
| WO | 0036207 A1 | 6/2000 | |
| WO | 0037385 A1 | 6/2000 | |
| WO | 0104224 A1 | 1/2001 | |
| WO | 0105745 A1 | 1/2001 | |
| WO | 0116626 A1 | 3/2001 | |
| WO | 0126668 A1 | 4/2001 | |
| WO | 0157118 A2 | 8/2001 | |
| WO | 0170509 A1 | 9/2001 | |
| WO | 0192924 A1 | 12/2001 | |
| WO | 0216974 A2 | 2/2002 | |
| WO | 02097481 A1 | 12/2002 | |
| WO | 03037960 A1 | 5/2003 | |
| WO | 03059967 A1 | 7/2003 | |
| WO | 03066714 A1 | 8/2003 | |
| WO | 2004050132 A2 | 6/2004 | |
| WO | 2004052422 A1 | 6/2004 | |

(56) References Cited

FOREIGN PATENT DOCUMENTS

| WO | 2006038080 A2 | 4/2006 |
|---|---|---|
| WO | 2006085351 A1 | 8/2006 |
| WO | 2007021180 A1 | 2/2007 |
| WO | 2008095955 A1 | 8/2008 |
| WO | 2009009639 A2 | 1/2009 |

OTHER PUBLICATIONS

Authors: Motoko Uchida, Toyoki Kunitake and Tisato Kajiyama Title: Blood compatibility-surface characteristic relationships of a Langmuir-Blodgett film composed of an anionic amphiphile-polycation complex Published: New Polymeric Mater. 1994, vol. 4, No. 3, pp. 199-211.

Authors: T.G. Vargo, J.M. Calvert, K.J. Wynne, J.K. Avlyanov, A.G. Macdiarmid and M.F. Rubner Title: Patterned polymer multilayer fabrication by controlled adhesion of polyelectrolytes to plasma-modified fluorpolymer surfaces Published: Supramolecular Science (1995) vol. 2, No. 3-4, pp. 169-174.

Authors: Dongsik Yoo, Jin-Kyu Lee, and M.F. Rubner Title: Investigations of New Self-Assembled Multilayer Thin Films Based on Alternately Adsorbed Layers of Polyelectrolytes and Functional Dye Molecules Published: Mat. Res. Soc. Symp. Proc. vol. 413 (1996) Materials Research Society pp. 395-400.

Authors: Dongsik Yoo and Michael F. Rubner Title: Layer-by-Layer Modification of Surfaces Through the Use of Self-Assembled Monolayers of Polyions Published: Antec 1995, pp. 2568-2570.

Authors: Dongsik Yoo, Aiping Wu, Jinkyu Lee and Michael F. Rubner Title: New Electro-Active Self-Assembled Multilayer Thin Films Based on Alternately Adsorbed Layers of Polyelectrolytes and functional dye Molecules Published: Synthetic Metals 85 (1997) pp. 1425-1426.

Authors: Lynn C. Winterton, Jack C. White and Kai C. Su Title: Coulometric Method for Measuring Oxygen Flux and Dk of Contact Lenses and Lens Materials Published: The Cornea: Transactions of the World Congress on the Cornea III, Raven Press 1988 pp. 273-280.

PCT International Search Report dated Jan. 16, 2013, International Application No. PCT/US2012/059479, International Filing Date Oct. 10, 2012.

PCT Written Opinion of the International Searching authority dated Jan. 16, 2013, International Application No. PCT/US2012/059479, International Filing Date Oct. 10, 2012.

Authors: Joél Baguet, Françoise Sommer, Véronique Claudon-Eyl and Iran Minh Duc Name of Article: Characterization of lacrymal component accumulation on worn soft contact lens surfaces by atomic force microscopy Published: Biomaterials 16 (1995) pp. 3-9.

Authors: Joél Baguet, Françoise Sommer, Tran Minh Duc Name of Article: Imaging surfaces of hydrophilic contact lenses with the atomic force microscope Published: Biomaterials 1993, vol. 14, No. 4, pp. 279-284.

Authors: Z M Jin and D Dowson Article: Elatohydrodynamic lubrication in biological systems Published: Proc. IMechE vol. 219, Part J: J. Engineering Tribology pp. 367-380.

Authors: Jeannine E. Elliott, Mara Macdonald, Jun Nie, Christopher N. Bowman Article: Structure and swelling of poly(acrylic acid) hydrogels: effect of pH, ionic strength, and dilution on the crosslinked polymer structure Published: Polymer 45 (2004) pp. 1503-1510.

Authors: Niriam V. Flores-Merino, Somot Chirasatitsin, Caterina Lopresti, Gwendolen C. Reilly, Giuseppe Battaglia and Adam J. Engler Article: Nanoscopic mechanical anisotropy in hydrogel surfaces Published: The Royal Society of Chemistry 2010.

Authors: F. Formasiero, J.M. Prausnitz, C.J. Radke Article: Post-lens tear-film depletion due to evaporative dehydration of a soft contact lens Published: Journal of Membrane Science 275 (2006) pp. 229-243.

Authors: Francesco Fornasiero, Florian Krull, John M. Prausnitz, Clayton J. Radke Article: Steady-state diffusion of water through soft-contact-lens materials Published: Biomaterials 26 (2005) pp. 5704-5716.

Authors: Jian Ping Gong, Takayuki Kurokawa, Tetsuharu Narita, Go Kagata, Yoshihito Osada, Goro Nishimura and Masataka Kinjo Article: Synthesis of Hydrogels with Extremely Low Surface Friction Published: J. Am. Chem. Soc. 2001, 123 pp. 5582-5583.

Authors: J.M. González-Méijome , J.B. Almeida and M.A. Parafita Article: Analysis of surface Mechanical Properties of Unworn and Worn Silicone Hydrogel Contact Lenses Using Nanoindentation with AFM Published: Microscopy: Science, Technology, Applications and Education, pp. 554-559.

Authors: George L. Grobe III, Paul L. Valint, Jr. and Daniel M. Ammon, Jr. Article: Surface chemical structure for soft contact lenses as a function of polymer processing Published: Journal of Biomedical Materials Research, vol. 32 pp. 45-54, 1996.

Authors: Murat Guvendiren, Jason A. Burdick, and Shu Yang Article: Kinetic study of swelling-induced surface pattern formation and ordering in hydrogel films with depth-wise crosslinking gradient Published: Soft matter, 2010, vol. 6, pp. 2044-2049.

Authors: Gavin Hoch, Anuj Chauhan, C. J. Radke Article: Permeability and diffusivity for water transport through hydrogel membranes Published: Journal of Membrane Science 214 (2003) 199-209.

Authors: R.E. Imhof, H.J.S. Birch, F.R. Thornley and J.R. Gilchrist Article: Opto-thermal Transient Emission Radiometry: a New Surface Analysis Technique Published: Analytical Proceedings, Jan. 1987, vol. 24, pp. 17-18.

Authors: L. Jones, C. May, L. Nazar, T. Simpson Article: in vitro evaluation of the dehydration characteristics of silicone hydrogel and conventional hydrogel contact lens materials Published: Contact Lens & Anterior Eye 25 (2002) pp. 147-156.

Authors: Lyndon Jones, Lakshman Subbaraman, Ronan Rogers, and Kathy Dumbleton Article: Surface treatment, wetting and modulus of silicone hydrogels Published: Contact Lens Monthly, Optician, Sep. 1, 2006, No. 6067, vol. 232, pp. 28-34.

Authors: Seong Han Kim, Aric Opdahl, Chris Marmo, Gabor A. Somorjai Article: AFM and SFG studies of pHEMA-based hydrogel contact lens surfaces in saline solution: adhesion, friction, and the presence of non-crosslinked polymer chains at the surface Published: Biomaterials 23 (2002) pp. 1657-1666.

Authors: Seong Han Kim, Chris Marmo, Gabor A. Somorjia Article: Friction studies of hydrogel contact lenses using AFM: non-crosslinked polymers of low friction at the surface Published: Biomaterials 22 (2001) pp. 3285-3294.

Authors: Gerald E. Lowther Article: Hydrophilic Lens Inspection with Phase Contrast Microscopy Published: American Journal of Optometry & Physiological Optics, vol. 58, No. 8, pp. 621-625, Aug. 1981.

Authors: M.D. Merindano, M. Canals, C. Saona and J. Costa Article: Rigid gas permeable contact lenses surface roughness examined by interferential shifting phase and scanning electron microscopies Published: Ophthal. Physiol. Opt. vol. 18, no. 1, pp. 75-92, 1998.

Authors: K.J. Stout, L. Blunt Article: Nanometres to micrometres: three-dimensional surface measurement in bio-engineering Published: Surface and Coatings Technology 71 (1995) pp. 69-81.

Authors: OǦuz Okay, Safiye B. Sariisik Article: Swelling behavior of poly(acrylamide-co-sodium acrylate) hydrogels in aqueous salt solutions: theory versus experiments Published: European Polymer Journal 36 (2000) pp. 393-399.

Authors: Sudi Patel, Waheeda Illahi, Arthur Davis Article: Changes in water content of high plus hydrogel lenses worn on an extended wear basis in a geriatric aphakic population Published: Contact Lens & Anterior Eye 28 (2005) pp. 127-134.

Authors: Carol E. Rabke, Paul L. Valint, Jr., and Daniel M. Ammon Article: Ophthalmic Applications of Atomic Force Microscopy Published: ICLC, vol. 22 Jan./Feb., 1995, pp. 32-41.

Authors: V. Rebeix, F. Sommer, B. Marchin, D. Baude, Tran Minh Duc Article Artificial tear adsorption on soft contact lenses: methods to test surfactant efficacy Published: Biomaterials, 21 (2000), pp. 1197-1205.

Authors: Ronan Rogers Article: in vitro and ex vivo wettability of hydrogel contact lenses Published: Thesis, University of Waterloo, Waterloo, Ontario, Canada, 2006.

(56) References Cited

OTHER PUBLICATIONS

Authors: F.M. Serry Article: Applications of Atomic Force Microscopy for Contact Lens Manufacturing Published: Veeco Instruments, www.veeco.com.
Authors: Christopher Snyder, Od, Ms, Faao Article: A Primer on Contact Lens Materials Published: http://www.clspectrum.com/references.asp.
Authors: Kim Sweers, Kees Van Der Werf, Martin Bennink and Vinod Subramaniam Article: Nanomechanical properties of a-synuclein amyloid fibrils: a comparative study by nanoindentation, harmonic force microscopy, and Peakforce QNM Published: Nanoscale Research Letters, 2011, 6:270, pp. 1-10.
Authors: Gareth Ross, Muriel Nasso, Val Franklin, Fiona Lydon and Brian Tighe Article: Silicone Hydrogels: Trends in Products and Properties Published: Biomaterials Research Unit, Aston University, Birmingham B4 &ET.
Authors: David A. Tirrell, Doreen Y. Takigawa and Kenji Seki Article: pH Sensitization of Phospholipid Vesicles via Complexation with Synthetic Poly(carboxylic acid)s Published: Annals New York Academy of Sciences, pp. 237-248.
Authors: Ioannis Tranoudis, Nathan Efron Article: Water properties of soft contact lens materials Published: Contact Lens & Anterior Eye 27 (2004) pp. 193-208.
Authors: Sean L. Willis, Jane L. Court, Richard P. Redman, Hin-Hai Wang, Simon W. Leppard,.Wincent J. O'Byrne, Sharon A. Small, Andrew L. Lewis, Stephen A. Jones, Peter W. Stratford Article: A novel phosphorylcholine-coated contact lens for extended wear use Published: Biomaterials 22 (2001) pp. 3261-3272.
Authors: Peng Xiao, Robert E. Imhof Article: Opto-Thermal Skin Water Concentration Gradient, Measurement Published: School of EE & IE, South Bank University, 103 Borough Road, London SE1 0AA, UK.
Authors: Sang-Kyu Kam, John Gregory Title: Charge determination of synthetic cationic polyelectrolytes by colloid titration Published: Colloids and Surfaces, A Physicochemical and Engineering Aspects 159 (1999) 165-179.
Authors: Niklaus Buhler, Hans-Peter Haerri, Manfred Hofmann, Christine Irrgang, Andreas Mühlebach, Beat Müller, and Friedrich Stockinger Title: Nelfilcon A, a New Material for Contact Lenses Published: Chimia 53 (1999) 269-274 Industrial Chemistry.
Authors: N. Dilsiz and G. Akovali Title: Plasma Polymerization of Selected Organic Compounds Published: Polymer, (1996) vol. 37, No. 2, pp. 333-342.
Author: Frank Jansen, Ph.D. Title: Plasma Deposited Thin Films (Chapter 1) Published in: Plasma Deposition Processes (19), CRC Press (1986), Boca Raton, FL, Editors: F. Jansen and J. Mort, Ph.D.
Author: H. Yasuda Title: Glow Discharge Polymerization Published: Journal of Polymer Science: Macromolecular Reviews, vol. 16 (1981), pp. 199-293.
Author: D. M. Mattox Title: The Application of Plasmas to Thin Film Deposition Processes Published: Plasma-Surface Interactions and Processing of Materials, Kluwer Academic Publishers in NATO ASI Series; Series E: Applied Scieces, vol. 176 (1990), pp. 377-399 Editors: O. Auciello, Alberto Gras-Marti, Jose Antonio Valles-Abarca, Daniel L. Flamm.
Authors: Kazuo Sugiyama and Koji Ohga Title of Article: Surface modified poly(methyl methacrylate) with 1-methyl-2-methacrylamidoethyl phosphorylcholine moiety Published: Macromol. Chem. Phys 200, No. 6 (1999) pp. 1439-1445.
Authors: Sean P. Cullen, Ian C. Mandel, and Padma Gopalan Title of article: Surace-Anchored Poly(2-vinyl-4,4-dimethyl azlactone) Brushes as Templates for Enzyme Immobilization Published: Langmuir, 2008 24 (23) pp. 13701-13709.
Authors: J. H. Cheung, A. F. Fou, M. Ferreira and M. F. Rubner Title of Article: Molecular Self-Assembly of Conducting Polymers: A New Layer-by-Layer Thin Film Deposition Process Published: Department of Materials Science and Engineering, Massachusetts Institute of Technology, Cambridge, MA 02139 pp. 757-758.
Authors: J.H. Cheung, W.B. Stockton, and M.F. Rubner Title of Article: Molecular-Level Processing of Conjugated Polymers. 3. Layer-by-Layer Manipulation of Polyaniline via Electrostatic Interactions Published: Macromolecules 1997 vol. 30, pp. 2712-2716.
Authors: John C. Crawford Title of Article: 2(2-Hydroxyphenyl)2H-benzotriazole ultraviolet stabilizers Published: Progress in Polymer Science, 1999, vol. 24 pp. 7-43.
Authors: Gero Decher, Birgit Lehr, Klaus Lowack, Yuri Lvov & Johannes Schmitt Title of Article: New nanocomposite films for biosensors: layer-by-layer adsorbed films of polyelectrolytes, proteins or DNA Published: Biosensors & Bilelectronics 1994, vol. 9, pp. 677-684.
Authors: M. Ferreiera and M.F. Rubner Title of Article: Molecular-Level Processing of Conjugated Polymers. 1. Layer-by-Layer Manipulation of Conjugated Polyions Published: American Chemical Society (Macromolecules) 1995, vol. 28, No. 21, pp. 7107-7114.
Authors: A.C. Fou and M.F. Rubner Title of Article: Molecular-Leval Processing of Conjugated Polymers. 2. Layer-by-Layer Manipulation of In-Situ Polymerized p-Type Doped Conducting Polymers Published: Macromolecules 1995, vol. 28, No. 21, pp. 7115-7120.
Authors: H. Kaczmarek, A Szalla, A. Kamińska Title of Article: Study of poly(acrylic acid)-poly(vinylpyrrolidone) complexes and their photostability Published: Polymer 42 (2001) pp. 6057-6069.
Authors: O. Onitsuka, A.C. Fou, M. Ferreira, B.R. Hsieh, and M.F. Rubner.Title of Article: Enhancement of light emitting diodes bases on self-assembled heterostructures of poly(p-phenylene vinylene) Published: J. Appl. Phys. 80 (7), Oct. 1, 1996 pp. 4067-4071.
Authors: G.B. Sukhorukov, H, Möhwald, G. Decher, Y.M. Lvov Title of Article: Assembly of polyelectrolyte multilayer films by consecutively alternating adsorption of polynucleotides and polycations Published: Thin Solid Films 284-285 (1996) 220-223.

\* cited by examiner ural group covalently linked to their UV-absorbing moieties, are known and have been used previously. Those UV-absorbers can be incorporated into the polymer matrix of ophthalmic lenses. However, unpolymerized UV-absorber must be removed through extraction process to ensure obtained ophthalmic lenses to have required biocompatibility for use. In addition, when the lens production is relied on UV-induced polymerization process, which has a processing cycle shorter than that of the thermo-induced polymerization process, there are several disadvantages associated with use of a known polymerizable UV-absorber. First, the efficiency of incorporation of the UV-absorber in lenses may not be certain. Second, a UV-absorber present in a lens forming composition can reduce the amount of UV radiation available to initiate polymerization and may even lower the efficiency of covalent incorporation of the UV absorber into resultant lenses. Unreacted UV absorbers generally must be removed from the lenses in one or more extraction processes. Third, a UV-absorber may result in ineffective or uneven photo-polymerization of the lens forming composition.

METHOD FOR MAKING UV-ABSORBING OPHTHALMIC LENSES

This application claims the benefits under 35 USC §119 (e) of U.S. provisional application No. 61/546,092 filed Oct. 12, 2011, incorporated by reference in its entirety.

This invention is related to a method for making ophthalmic lenses (including contact lenses and intraocular lenses) capable of blocking ultra-violet ("UV") radiation and thereby protecting eyes to some extent from damages caused by UV radiation. This invention also provides UV-absorbing ophthalmic lenses made according to a method of the invention.

BACKGROUND

UV-absorbing ophthalmic lenses, in particular UV-absorbing contact lenses are typically produced in mass by a so-called cast-molding process, which involves thermo- or UV-induced free-radical polymerization of a lens-forming composition including a polymerizable UV-absorber and at least one vinylic monomer, macromer and or prepolymer in molds. Copolymerizable benzotriazole, benzophenone and triazine UV absorbers, which include an ethylenically unsaturated group covalently linked to their UV-absorbing moieties, are known and have been used previously. Those UV-absorbers can be incorporated into the polymer matrix of ophthalmic lenses. However, unpolymerized UV-absorber must be removed through extraction process to ensure obtained ophthalmic lenses to have required biocompatibility for use. In addition, when the lens production is relied on UV-induced polymerization process, which has a processing cycle shorter than that of the thermo-induced polymerization process, there are several disadvantages associated with use of a known polymerizable UV-absorber. First, the efficiency of incorporation of the UV-absorber in lenses may not be certain. Second, a UV-absorber present in a lens forming composition can reduce the amount of UV radiation available to initiate polymerization and may even lower the efficiency of covalent incorporation of the UV absorber into resultant lenses. Unreacted UV absorbers generally must be removed from the lenses in one or more extraction processes. Third, a UV-absorber may result in ineffective or uneven photo-polymerization of the lens forming composition.

Therefore, there still exists a need for a cost-effective method for making UV-absorbing contact lenses.

SUMMARY

In one aspect, the invention provides a method for making UV-absorbing ophthalmic lenses, the method comprising the steps of: obtaining an ophthalmic lens, preferably a contact lens; dipping the ophthalmic lens in a coating solution comprising a first organic solvent and a UV-absorbing polymer for a period of time sufficient to form a UV-absorbing coating on the ophthalmic lens; wherein the UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units; and optionally but preferably covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material.

In another aspect, the invention provides an ophthalmic lenses, the lens comprising a polymeric lens body; a layer of UV-absorbing polymer on the lens body; and a hydrogel coating covalently attached onto the layer of the UV-absorbing polymer, wherein the UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units, wherein the hydrogel coating is obtained by covalently attaching a hydrophilic polymer or polymeric material having reactive functional groups onto the layer of the UV-absorbing polymer through linkages each formed between one carboxylic group of the UV-absorbing coating and one reactive functional group of the hydrophilic polymer or polymeric material.

The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTIONS OF THE DRAWINGS

FIG. 1 shows the UV-Vis transmission spectra of silicone hydrogel contact lenses with coatings thereon obtained by dipping in a fluorescein-modified PAA solution for different time periods. A: 5 seconds; B: 60 seconds; C: 10 minutes; D: one hour; E: 5 hours; F: 24 hours.

DETAILED DESCRIPTION

Figure 1:
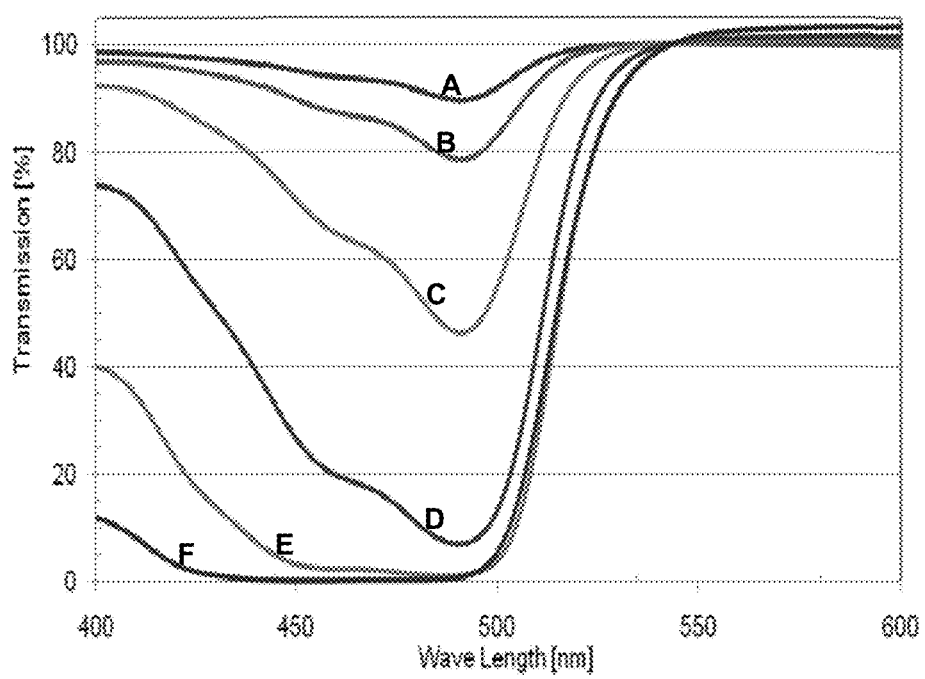

Before the present methods are disclosed and described, it is to be understood that the aspects described below are not limited to specific compounds, steps, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a monomer" includes mixtures of two or more such monomers, and the like.

"Optional" or "optionally" means that the subsequently described event or circumstance can or cannot occur, and that the description includes instances where the event or circumstance occurs and instances where it does not.

Unless defined otherwise, all technical and scientific terms used herein have the same meaning as commonly understood by one of ordinary skill in the art to which this invention belongs. As employed throughout the disclosure, the following terms, unless otherwise indicated, shall be understood to have the following meanings.

An "ophthalmic lens" refers to a contact lens and/or an intraocular lens. A "contact Lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

The term "soluble", in reference to a compound or material in a solvent, means that the compound or material can be dissolved in the solvent to give a solution with a concentration of at least 0.5% by weight at room temperature (i.e., at a temperature of about 20° C. to about 30° C.).

The term "insoluble", in reference to a compound or material in a solvent, means that the compound or material can be dissolved in the solvent to give a solution with a concentration of less than 0.005% by weight at room temperature.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

A "vinylic monomer" refers to a compound that is soluble in a solvent and has one sole ethylenically-unsaturated group.

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl

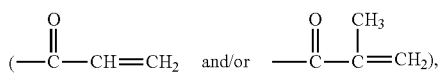

allyl, vinyl

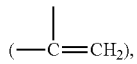

styrenyl, or other C=C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which can be polymerized to form a homopolymer that is water-soluble or can absorb at least 10 percent by weight of water.

A "hydrophobic vinylic monomer" refers to a vinylic monomer which can be polymerized to form a homopolymer that is insoluble in water and can absorb less than 10 percent by weight of water.

As used in this application, the term "macromer" or "prepolymer" refers to a medium and high molecular weight compound or polymer that is soluble in a solvent and contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

As used in this application, the term "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of amine groups of the polyamine or polyamidoamine into azetidinium groups.

The term "azetidinium group" refers to a positively charged group of

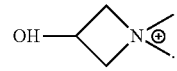

As used in this application, the term "phosphorylcholine" refers to a zwitterionic group of

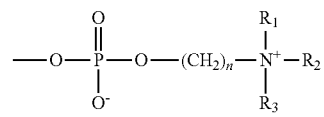

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "water contact angle" refers to an average water contact angle (i.e., contact angles measured by Sessile Drop method), which is obtained by averaging measurements of contact angles.

As used in this application, the term "crosslinked coating" or "hydrogel coating" interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

"Polymer" means a material formed by crosslinking or polymerizing one or more monomers.

The invention is generally directed to a cost-effective and time-efficient method for making UV-absorbing ophthalmic lenses, in particular, contact lenses. In contrast to the conventional method for making UV-absorbing ophthalmic lenses which involves copolymerizing a lens forming composition including a UV-absorbing vinylic monomer, a method of the invention involves a simple dipping process to apply a UV-absorbing coating onto an ophthalmic lens posterior to molding. The invention is partly based on the discovery that a layer (or coating) of a UV-absorbing polymer with carboxyl groups can be easily applied onto a cast-molded ophthalmic lens just by dipping the ophthalmic lens in a solution of the UV-absorbing polymer. The thickness and durability of the UV-absorbing coating can be controlled by using an organic solvent as the solvent or one of the solvent mixture in the UV-absorbing polymer solution and then rinsing with water or a mixture of water and at least one organic solvent. It is believed that when a solvent system containing at least one organic solvent is used for preparing a coating solution, it can swell an ophthalmic lens so that a portion of the UV-absorbing polymer may penetrate into the ophthalmic lens and increase the thickness of the UV-absorbing coating. The subsequent water-rinsing step can shrink the ophthalmic lens and embed partially the UV-absorbing polymer and increase the durability of the UV-absorbing coating.

The present invention can provide the following advantages. First, the incorporation of UV-absorbing agents to an ophthalmic lens is carried out after curing a lens-forming composition in a mold and thereby can overcome the disadvantages of using a UV-absorbing vinylic monomer described previously in the section "Background." Second, the whole process is based on wet chemistry (dipping ophthalmic lenses in a solution for a period of time). Such process can be easily implemented in a fully-automated, mass-production environment. Third, the process for incorporating UV-absorbers can be an integral part of a coating process for applying a hydrogel coating onto a contact lens.

In one aspect, the invention provides a method for making UV-absorbing ophthalmic lenses, the method comprising the steps of: obtaining an ophthalmic lens, preferably a contact lens; dipping the ophthalmic lens in a coating solution comprising a first organic solvent and a UV-absorbing polymer for a period of time sufficient to form a UV-absorbing coating on the ophthalmic lens; wherein the UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units; and optionally but preferably covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material.

In accordance with the invention, a contact lens can be any contact lens, including soft and hard contact lens. A preferred soft contact lens is a silicone hydrogel contact lens.

A person skilled in the art will know well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,789,464; and 5,849,810, or by lathe cutting of silicone hydrogel buttons as used in making customized contact lenses. In cast-molding, a lens formulation typically is dispensed into molds and cured (i.e., polymerized and/or crosslinked) in molds for making contact lenses. For production of preferred silicone hydrogel contact lenses, a lens formulation for cast-molding of contact lenses generally comprises at least one components selected from the group consisting of a silicone-containing vinylic monomer, a silicone-containing vinylic macromer, a hydrophilic vinylic monomer, a hydrophilic vinylic macromer, a hydrophobic vinylic monomer, and combination thereof. It must be understood that a lens-forming composition can also comprise various components, such as, for example, a crosslinking agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Resultant silicone hydrogel contact lenses then can be subjected to extraction with an extraction solvent to remove unpolymerized components from the resultant lenses and to hydration process, as known by a person skilled in the art. In addition, a contact lens can be a colored contact lens (i.e., a contact lens having at least one colored patterns printed thereon as well known to a person skilled in the art).

A person skilled in the art knows very well how to prepare a lens formulation. Numerous non-silicone hydrogel lens formulation and silicone hydrogel lens formulations have been described in numerous patents and patent applications published by the filing date of this application. All of them can be used in obtaining a contact lens. A silicone hydrogel lens formulation for making commercial silicone hydrogel contact lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in making silicone hydrogel contact lenses which then can be used to make UV-absorbing contact lenses according to a method of the invention.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, a UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units; each UV-absorbing monomeric unit comprises a UV-absorbing moiety which can be benzotriazole-moiety, benzophenone-moiety or triazine moiety, with benzotriazole-moiety or benzophenone-moiety as preferred UV-absorbing moiety, with benzotriazole-moiety as most preferred UV-absorbing moiety. As used in this application, the term "monomeric units" refers to repeating units of a polymer, which are derived from a vinylic monomer in a polymerization and optionally can be modified by a compound after polymerization.

A UV-absorbing polymer of the invention can be obtained by copolymerizing a polymerizable mixture comprising at least one carboxyl-containing vinylic monomer and at least one UV-absorbing vinylic monomer in the presence or absence of a vinylic monomer, provided that the carboxyl-containing vinylic monomer is present in an amount of at least about 50%, preferably at least about 60%, more preferably at least about 70%, even more preferably at least about 80%, most preferably at least about 90% by mole in the polymerizable composition.

Any UV-absorbing vinylic monomers can be used in the preparation of a UV-absorbing polymer of the invention. Examples of preferred UV-absorbing vinylic monomers include without limitation benzotriazole-containing vinylic monomers (e.g., 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, or combination thereof); benzophenone-containing vinyl monomers (e.g., 2-hydroxy-4-acryloxy alkoxy benzophenone, 2-hydroxy-4-methacryloxy alkoxy benzophenone, allyl-2-hydroxybenzophenone, and 2-hydroxy-4-methacryloxy benzophenone, or combinations thereof); or combination thereof. Benzotriazole-containing vinyl monomers can be prepared according to procedures described in U.S. Pat. Nos. 3,299,173, 4,612,358, 4,716,234, 4,528,311 (herein incorporated by reference in their entireties) or can be obtained from commercial suppliers. Benzophenone-containing vinyl monomers can be prepared according to procedures described in U.S. Pat. No. 3,162,676 (herein incorporated by reference in its entirety) or can be obtained from commercial suppliers.

Any suitable carboxyl-containing vinylic monomers can be used in the preparation of a UV-absorbing polymer of the invention. Examples of preferred carboxyl-containing vinylic monomers include without limitation acrylic acid, $C_1$-$C_{12}$ alkylacrylic acid (e.g., methacrylic acid, ethylacrylic acid, propylacrylic acid, butylacrylic acid, pentylacrylic acid, etc.), N,N-2-acrylamidoglycolic acid, beta-methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof. Preferably, a UV-absorbing polymer is prepared from at least one carboxyl-containing vinylic monomer selected from the group consisting of acrylic acid, $C_1$-$C_6$ alkylacrylic acid, and combinations thereof.

Alternatively, a UV-absorbing polymer of the invention can be obtained by reacting a UV-absorbing compound with (i.e., covalently attaching UV-absorbing moieties to) a precursor polymer having at least about 50%, preferably at least about 60%, more preferably at least about 70%, even more preferably at least about 80%, most preferably at least about 90%, by mole of carboxyl-containing monomeric units in a coupling reaction known to a person skilled in the art.

A "coupling reaction" is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof. Non-limiting examples of coupling reactions under various reaction conditions between a pair of matching co-reactive functional groups selected from the group preferably consisting of amino group (—NHR' as defined above), hydroxyl group, carboxylic acid group, acid halide groups (—COX, X=Cl, Br, or I), acid anhydrate group, aldehyde group, azlactone group, isocyanate group, epoxy group, aziridine group, thiol group, and amide groups (—CONH$_2$), are given below for illustrative purposes. A carboxylic acid group reacts with an amino group —NHR' in the presence of a coupling agent-carbodiimide (e.g., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; a carboxylic acid group reacts with an isocyanate group under heating to form an amide linkage; a carboxyl group reacts with an epoxy or aziridine group to form an ester bond; a carboxyl group reacts with a halide group (—Cl, —Br or —I) to form an ester bond; an amino group reacts with aldehyde group to form a Schiff base which may further be reduced; an amino group —NHR' reacts with an acid chloride or bromide group or with an acid anhydride group to form an amide linkage (—CO—NR'—); an amino group —NHR' reacts with an isocyanate group to form a urea linkage (—NR'—C(O)—NH—); an amino group —NHR' reacts with an epoxy or aziridine group to form an amine bond (C—NR'); an amino group reacts (ring-opening) with an azlactone group to form a linkage (—C(O)NH—CR$_1$R$_2$—(CH$_2$)$_r$—C(O)—NR'—); a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form a linkage (—C(O)NH—CR$_1$R$_2$—(CH$_2$)$_r$—C(O)—O—); a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thiolester linkage; a thiol group reacts with an azlactone group in the presence of a catalyst to form a linkage (—C(O)NH-alkylene-C(O)—S—); a thiol group reacts with a vinyl group based on thiol-ene reaction under thiol-ene reaction conditions to form a thioether linkage (—S—); and a thiol group reacts with an acryloyl or methacryloyl group based on Michael Addition under appropriate reaction conditions to form a thioether linkage.

It is also understood that coupling agents with two reactive functional groups may be used in the coupling reactions. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, two epoxy, two aziridine, two carboxyl, two acid halide, or two azlactone groups, or combinations thereof.

The reactions conditions for the above described coupling reactions are taught in textbooks and are well known to a person skilled in the art.

Any polymer comprising at least about 50%, preferably at least about 60%, more preferably at least about 70%, even more preferably at least about 80%, most preferably at least about 90%, by mole of carboxyl-containing monomeric units can be used as precursor polymer in the preparation of a UV-absorbing polymer. Preferably, a precursor polymer is: a homopolymer of a carboxyl-containing vinylic monomer (acrylic acid or $C_1$-$C_{12}$ alkylacrylic acid); a copolymer of acrylic acid and $C_1$-$C_{12}$ alkylacrylic acid; a copolymer of a carboxyl-containing vinylic monomer (acrylic acid or $C_1$-$C_{12}$ alkylacrylic acid) and an amino-containing vinylic monomer (e.g., amino-$C_2$-$C_6$ alkyl(meth)acrylate, $C_1$-$C_6$ alkylamino-$C_2$-$C_6$ alkyl(meth)acrylate, allylamine, vinylamine, amino-$C_2$-$C_6$ alkyl(meth)acrylamide, $C_1$-$C_6$ alkylamino-$C_2$-$C_6$ alkyl(meth)acrylamide); a copolymer of a carboxyl-containing vinylic monomer (acrylic acid or $C_1$-$C_{12}$ alkylacrylic acid) and one or more hydrophilic vinylic monomers being free of carboxyl or amino group and selected from the group consisting of acrylamide (AAm), methacrylamide N,N-dimethylacrylamide (DMA), N,N-dimethyl methacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropyl methacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl(meth)acrylate, hydroxypropyl(meth)acrylate, $C_1$-$C_4$-alkoxy polyethylene glycol(meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof. More preferably, a precursor polymer is polyacrylic acid, polymethacrylic acid, poly($C_2$-$C_{12}$ alkylacrylic acid), poly(acrylic acid-co-methacrylic acid), poly[$C_2$-$C_{12}$ alkylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], or combinations thereof.

Any UV-absorbing compounds, which comprises UV-absorbing moieties and a reactive functional group selected from the group consisting of amino group, azlactone group, epoxy group, isocyanate group, aziridine group, and combination thereof, can be used in the invention. A preferred UV-absorbing compound having a benzotriazole-moiety, which can be used in the invention, is represented by formula I, II, or III

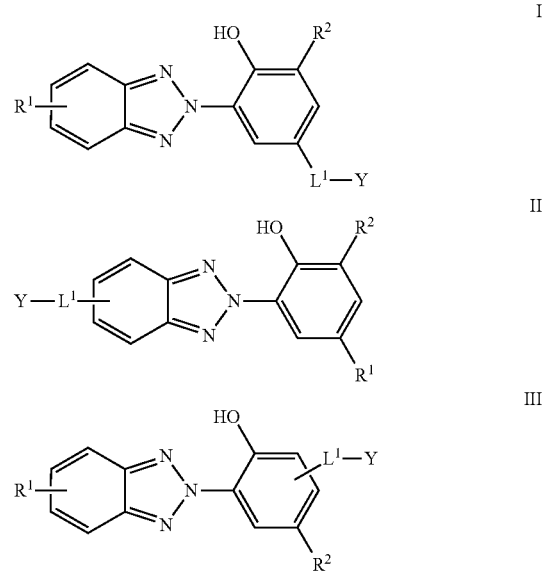

wherein:

$R^1$ and $R^2$ independently of each other are hydrogen, a $C_1$-$C_{12}$ linear or branched alkyl group, a halogen (Cl or Br), a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

$L^1$ is a covalent bond or a divalent radical of —$X_a$-$E_1$-$X_b$-$E_2$-$X_c$— in which $X_a$ is a covalent bond, —O—, carbonyl

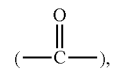

a divalent radical of —($R^aO$)$_n$— in which $R^a$ is a linear or branched $C_1$-$C_{12}$-alkylene and n is from 1 to 10,

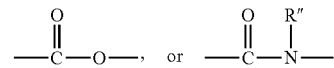

in which R″ is H or $C_1$-$C_8$ alkyl, $E_1$ and $E_2$ independently of each other are a covalent bond, a divalent radical of —($R^aO$)$_n$— in which $R^a$ and n are defined above,

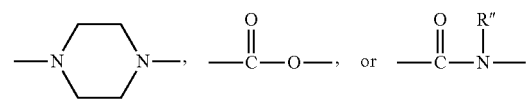

in which R″ is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)$L^2$C(O)— in which $L^2$ is a $C_1$ to $C_{12}$ linear or branched alkylene divalent radical or —$(R^{e1}$—$O)_{w1}$—$(R^{e2}$—$O)_{w2}$—$(R^{e3}$—$O)_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (w1+w2+w3) is 1 to 60, and $X_b$ and $X_c$ independently of each other are a covalent bond, carbonyl,

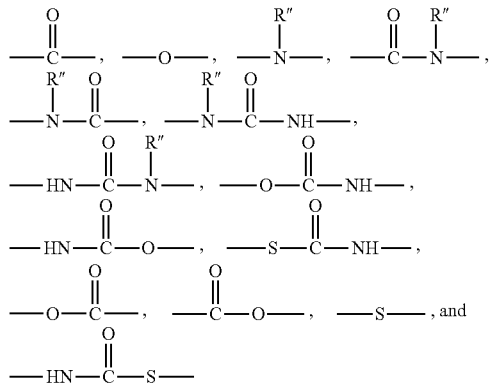

in which R" is defined above; and

Y is an azlactone group, an epoxy group, an isocyanate group, an aziridine group, or an amino group of —NHR' in which R' is hydrogen or a $C_1$-$C_{12}$ unsubstituted or substituted, linear or branched alkyl group.

Examples of amino-containing UV-absorbing compounds of formula I, II or III include without limitation 2-(2'-hydroxy-3'-aminomethyl-5'-methylphenyl)-2H-benzotriazole, 2-(2'-hydroxy-5'-aminophenyl)-2H-benzotriazole, 2-(2'-hydroxy-4'-(3-aminopropoxy)phenyl)-2H-benzotriazole, 2-(2'-hydroxy-4'-ethylaminophenyl)-5-chloro-benzotriazole. Alternatively, amino-containing UV-absorbing compounds of formula I, II, or III can be prepared from a benzotriazole-containing vinyl monomer (any one of those described above) by reacting its ethylenically-unsaturated group with an aminomercaptan (e.g., 2-aminoethanethiol) according to Michael Addition or thiol-ene reaction well known to a person skilled in the art.

UV-absorbing compounds of formula I, II or III in which Y is an azlactone group, an epoxy group, or an isocyanate group can be prepared from a bezotriazole compound having one hydroxyalkoxy group or an amino group by reacting it with an excess molar equivalent amount of a di-azlactone compound, a di-epoxy compound, or a di-isocyanate compound under customary coupling reaction condition well known to a person skilled in the art.

Examples of di-epoxy compounds are neopentyl glycol diglycidyl ether, 1,6-hexanediol diglycidyl ether, ethylene glycol diglycidyl ether, diethylene glycol diglycidyl ether, polyethylene glycol diglycidyl ether, propylene glycol diglycidyl ether, and dipropylene glycol diglycidyl ether. Such di-epoxy compounds are available commercially (e.g., those DENACOL series di-epoxy compounds from Nagase ChemteX Corporation). Examples of $C_{10}$-$C_{24}$ di-azlactone compounds include those described in U.S. Pat. No. 4,485,236 (herein incorporated by reference in its entirety). Examples of $C_4$-$C_{24}$ diisocyanates can be used in the invention. diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, cyclohexane diisocyanate, and combinations thereof.

In formula I, II or III, Y preferably is an amino group of —NHR' in which R' is hydrogen or a $C_1$-$C_{12}$ unsubstituted or substituted, linear or branched alkyl group.

A preferred UV-absorbing compound having a benzophenone-moiety, which can be used in the invention, is represented by formula IV

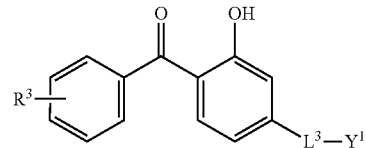

IV in which $R^3$ is hydrogen, a $C_1$-$C_{12}$ linear or branched alkyl group, a halogen, a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group;

$L^3$ is a covalent bond or a divalent radical of —$X_a$-$E_1$-$X_b$-$E_2$-$X_c$— in which $X_a$ is a covalent bond, —O—, carbonyl

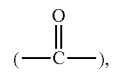

a divalent radical of —$(R^aO)_n$— in which $R^a$ is a linear or branched $C_1$-$C_{12}$-alkylene and n is from 1 to 10,

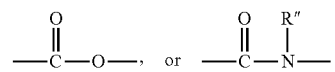

in which R" is H or $C_1$-$C_8$ alkyl, $E_1$ and $E_2$ independently of each other are a covalent bond, a divalent radical of —$(R^aO)_n$— in which $R^a$ and n are defined above,

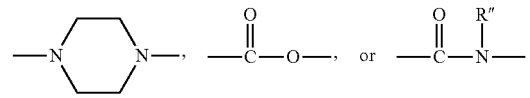

in which R" is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula —C(O)$L^2$C(O)— in which $L^2$ is a $C_1$ to $C_{12}$ linear or branched alkylene divalent radical or —$(R^{e1}$—$O)_{w1}$—$(R^{e2}$—$O)_{w2}$—$(R^{e3}$—$O)_{w3}$—, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (w1+w2+w3) is 1 to 60, and $X_b$ and $X_c$ independently of each other are a covalent bond, carbonyl,

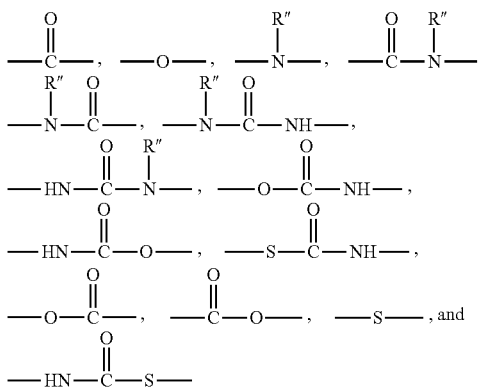

in which R" is defined above; and $Y^1$ is an azlactone group, an epoxy group, an isocyanate group, an aziridine group, or an amino group of —NHR in which R is hydrogen or a $C_1$-$C_{12}$ unsubstituted or substituted, linear or branched alkyl group.

In formula IV, $Y^1$ preferably is an amino group of —NHR in which R is hydrogen or a $C_1$-$C_{20}$ unsubstituted or substituted, linear or branched alkyl group.

Amino-containing UV-absorbing compounds of formula IV can be prepared from a benzophenone-containing vinyl monomer by reacting its ethylenically-unsaturated group with an aminomercaptan (e.g., 2-aminoethanethiol) according to Michael Addition or thiol-ene reaction well known to a person skilled in the art. Resultants amino-containing UV-absorbing compounds of formula IV then can be used directly in the invention or in preparing UV-absorbing compounds of formula IV in which $Y^1$ is an azlactone group, an epoxy group, or an isocyanate group, by reacting an amino-containing UV-absorbing compounds of formula IV with an excess molar equivalent amount of a di-azlactone compound, a di-epoxy compound, or a di-isocyanate compound under customary coupling reaction condition well known to a person skilled in the art.

In a preferred embodiment, the UV-absorbing compound comprises one or more compounds of formula I, II, III or IV, preferably of formula I, II or III, in which Y and $Y^1$ is an amino group of —NHR' in which R' is hydrogen or a $C_1$-$C_{12}$ unsubstituted or substituted, linear or branched alkyl group, $R^1$ and $R^2$ independent of each other are hydrogen, halogen, $C_1$-$C_6$ linear or branched alkoxy, $C_1$-$C_{12}$ linear or branched alkyl (preferably t-butyl), or $C_6$-$C_{15}$ aryl, L is a covalent bond or a divalent radical of —$X_a$-$E_1$-$X_b$-$E_2$-$X_c$— in which $X_a$ is a covalent bond or

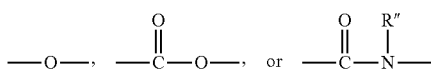

in which R" is H or $C_1$-$C_8$ alkyl, $E_1$ and $E_2$ independently of each other are a covalent bond, a divalent radical of —$(R^aO)_n$— in which $R^a$ is a linear or branched $C_1$-$C_{12}$-alkylene and n is from 1 to 10, a $C_1$ to $C_{12}$ linear or branched alkylene divalent radical, a cycloalkyl divalent radical with up to 12 carbon atoms, an alkylcycloalkyl divalent radical with up to 20 carbon atoms, an alkylphenyl divalent radical with up to 20 carbon atoms, or an phenylalkylene divalent radical with up to 20 carbon atoms, $X_b$ and $X_c$ independently of each other are a covalent bond, carbonyl,

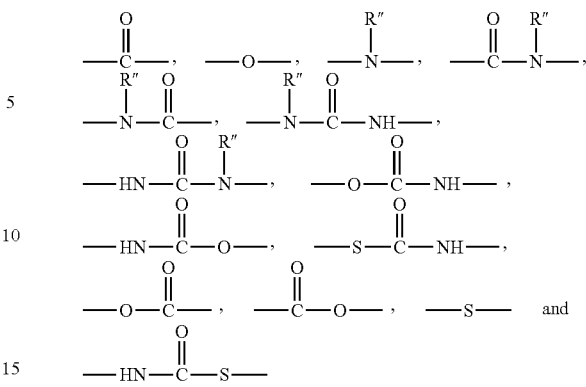

in which R" is defined above; and Y is an amino group of —NHR in which R is hydrogen or a $C_1$-$C_6$ unsubstituted or substituted, linear or branched alkyl group.

A solution of a UV-absorbing polymer for forming a UV-absorbing layer (coating) on contact lenses can be prepared by dissolving one or more UV-absorbing polymers in water, a mixture of water and one or more organic solvents miscible with water, an organic solvent, or a mixture of one or more organic solvent. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methylpyrrolidinone, and mixtures thereof.

Preferably, the UV-absorbing polymers are dissolved in a mixture of water and one or more organic solvents, an organic solvent, or a mixture of one or more organic solvent. It is believed that a solvent system containing at least one organic solvent can swell a contact lens so that a portion of the UV-absorbing polymer may penetrate into the contact lens and increase the thickness and durability of the UV-absorbing coating. Any organic solvents described above can be used in preparation of a solution of the UV-absorbing polymer, so long as it can dissolve the UV-absorbing polymer.

Contacting of a contact lens with a solution of a UV-absorbing polymer can be carried in any manner known to a person skilled in the art. A preferred contact method is dipping a contact lens in the solution or spraying the contact with the solution, with the former being preferred. It is understood that, before contacting with a solution of a UV-absorbing polymer, a contact lens can be subjected to extraction with an extraction solvent to remove unpolymerized components from the molded lens, as known by a person skilled in the art. Alternatively, extraction step can be carried out after a coating (layer) of the UV-absorbing polymer is applied onto the contact lens.

In a preferred embodiment, the first organic solvent is present in an amount of at least about 60%, preferably at least about 70%, more preferably at least about 80%, even more preferably at least about 90%, most preferably at least about 95% by weight in the coating solution, and the method of the invention further comprises a step of rinsing the ophthalmic lens having the UV-absorbing coating thereon with a mixture of water and at most about 50%, preferably at most about 40%, more preferably at most about 30%, even more preferably at most about 20%, most preferably at most about 10% by weight of a second organic solvent (which can be identical to or different from the first organic solvent).

In another preferred embodiment, a method of the invention comprises a step of covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material. Any hydrophilic polymer and any hydrophilic polymeric material, which comprises reactive functional groups, can be used in the invention, so long as the hydrophilic polymer or the hydrophilic polymeric material can be dissolved in any solvent or solvent system, preferably in water. Examples of reactive functional groups include without limitation azetidinium groups, epoxy groups, isocyanate groups, aziridine groups, azlactone groups, amino groups, carboxyl groups, and combinations thereof. Preferably, a water-soluble and crosslinkable hydrophilic polymeric material used for forming the hydrogel coating is a partially-crosslinked polymeric material that comprises a three-dimensional network and reactive functional groups selected from the group consisting of azetidinium groups, epoxy groups, isocyanate groups, aziridine groups, azlactone groups, amino groups, carboxyl groups, and combinations thereof, with azetidinium groups as most preferred embodiment, within the network. The term "partially-crosslinked" in reference to a polymeric material means that the reactive functional (crosslinkable) groups of starting materials for making the polymeric material in crosslinking reaction have not been fully consumed. In a preferred embodiment, a hydrophilic polymer or hydrophilic polymeric material for forming the hydrogel coating comprises UV-absorbing moieties. The UV-absorbing moieties can be introduced by coupling a UV-absorbing compound of formula (I), (II), (III) or (IV) above to a hydrophilic polymer or hydrophilic polymeric material (as described above), so long as not all of the reactive functional groups of the hydrophilic polymer or polymeric material is consumed. By having a hydrogel coating on top of UV-absorbing coating, the hydrophobic UV-absorbing moieties can be buried below a hydrogel surface and would not affect the hydrophilicity and wettability of the contact lenses.

Any hydrophilic polymers comprising reactive functional groups selected from the group consisting of azetidinium groups, epoxy groups, isocyanate groups, aziridine groups, azlactone groups, amino groups, carboxyl groups, and combinations thereof can be used in the formation of hydrogel coating (hydrogel coatings) according to any coupling reactions known to a person skilled in the art. Preferably, the mole percentage of monomeric units containing a reactive functional group is about 40% or less, preferably about 35% or less, more preferably about 30% or less, even more preferably about 25% or less, most preferably about 20% or less. By using a hydrophilic polymer having a relatively small mole percentage of monomeric units each with a reactive functional group, a hydrogel (crosslinked) coating can have a relatively low crosslinkage density and thereby a low softness (elastic modulus) and lubricity for comfort. Examples of preferred hydrophilic polymers for forming hydrogel coatings on contact lenses include without limitation copolymers comprising at least about 60% by mole of at least one non-reactive vinylic monomer and at most about 40% by mole of at least one reactive vinylic monomers, wherein the reactive vinylic monomer is selected from the group consisting of a carboxyl-containing vinylic monomer, an amino-containing vinylic monomer, an epoxy-containing vinylic monomer, an aziridine-containing vinylic monomer, an azlactone-containing vinylic monomer, an isocyanate-containing vinylic monomer, combinations thereof, wherein the non-reactive hydrophilic vinylic monomer is selected from the group consisting of acrylamide (AAm), N,N-dimethylacrylamide (DMA), N-vinylpyrrolidone (NVP), N-vinyl-N-methyl acetamide, glycerol(meth)acrylate, hydroxyethyl(meth)acrylate, N-hydroxyethyl(meth)acrylamide, $C_1$-$C_4$-alkoxy polyethylene glycol(meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl(meth)acrylate, N,N-dimethylaminopropyl (metha)crylamide, (meth)acryloyloxyethyl phosphorylcholine, and combinations thereof.

Examples of amino-containing vinylic monomers include without limitation amino-$C_1$-$C_6$ alkyl(meth)acrylate, $C_1$-$C_6$ alkylamino-$C_1$-$C_6$ alkyl(meth)acrylate, allylamine, vinylamine, amino-$C_1$-$C_6$ alkyl(meth)acrylamide, $C_1$-$C_6$ alkylamino-$C_1$-$C_6$ alkyl(meth)acrylamide, di-amino-$C_1$-$C_6$ alkyl(meth)acrylamide, di-$C_1$-$C_6$ alkylamino-$C_1$-$C_6$ alkyl(meth)acrylamide, or combinations thereof.

Examples of azlactone-containing vinylic monomers include without limitation 2-vinyl-4,4-dimethyl-1,3-oxazolin-5-one, 2-isopropenyl-4,4-dimethyl-1,3-oxazolin-5-one, 2-vinyl-4-methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5- one (VDMO) and 2-isopropenyl-4,4-dimethyl-1,3-oxazolin-5-one (IPDMO) as preferred azlactone-containing vinylic monomers.

Examples of epoxy-containing vinylic monomers includes without limitation glycidyl(meth)acrylate, ally glycidyl ether, methylallyl glycidyl ether, glycidyl(meth)acrylamide, C1-C6 hydroxyalkyl(meth)acrylate dlycidyl ether (e.g., 4-hydroxypropyl(meth)acrylate glycidyl ether, hydroxypropyl(meth)acrylate glycidyl ether, hydroxyethyl(meth)acrylate glycidyl ether), glycidyl(meth)acrylamide, di-glycidyl (meth)acrylamide, glycidyl ethacrylate, glycidyl itaconate, methylglycidyl(meth)acrylate, 3,4-epoxy-1-vinylcyclohexane, and those disclosed in U.S. Pat. No. 5,677,398 (herein incorporated by reference in its entirety).

Examples of isocyanate-containing vinylic monomers include without limitation isocyanato-$C_1$-$C_6$ alkyl(meth)acrylate.

Examples of aziridine-containing vinylic monomers include without limitation aziridinyl C1-C12 alkyl(meth)acrylate (e.g., 2-(1-aziridinyl)ethyl(meth)acrylate, 3-(1-aziridinyl)propyl(meth)acrylate, 4-(1-aziridinyl)butyl(meth)acrylate, 6-(1-aziridinyl)hexyl(meth)acrylate, or 8-(1-aziridinyl)octyl(meth)acrylate), and those aziridinyl vinyl monomers disclosed in U.S. Pat. No. 3,974,131 (herein incorporated by reference in its entirety) (e.g., diethylen glycol mono-(meth)acrylate mono-2-aziridinyl propionate).

In a preferred embodiment, the water-soluble and crosslinkable hydrophilic polymeric material for forming the hydrogel coating (or crosslinked coating) comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains. Preferably, at least one of a first and second polymer chains comprises UV-absorbing monomeric units.

With such a water-soluble and crosslinkable hydrophilic polymeric material, the hydrogel coating (or crosslinked coating) can be formed by simply heating a contact lens having the UV-absorbing coating thereon in an aqueous solution in the presence of the hydrophilic polymeric material to and at a temperature from about 40° C. to about 140° C. for a period of time sufficient to covalently attach the hydrophilic polymeric material onto the surface of the contact lens through covalent linkages each formed between one azetidinium group of the hydrophilic polymeric material and one of the carboxyl groups of the UV-absorbing coating on the contact lens, thereby forming a crosslinked hydrophilic coating on the contact lens. It is understood that any water-soluble and crosslinkable hydrophilic polymeric material containing reactive functional groups (e.g., those described above) can be used in the invention to form the hydrogel coating of a contact lens.

A water-soluble and thermally-crosslinkable hydrophilic polymeric material containing azetidinium groups comprises (i.e., has a composition including) from about 20% to about 95%, preferably from about 35% to about 90%, more preferably from about 50% to about 85%, by weight of first polymer chains derived from an epichlorohydrin-functionalized polyamine or polyamidoamine and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, thiol group, and combination thereof. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of an epichlorohydrin-functionalized polyamine or polyamidoamine and about 25% by weight of at least one hydrophilicity-enhancing agent based on the total weight of the reactants, then the resultant hydrophilic polymeric material comprise about 75% by weight of first polymer chains derived from the epichlorohydrin-functionalized polyamine or polyamidoamine and about 25% by weight of hydrophilic moieties or second polymer chains derived from said at least one hydrophilicity-enhancing agent. The azetidinium groups of the thermally-crosslinkable hydrophilic polymeric material are those azetidinium groups (of the epichlorohydrin-functionalized polyamine or polyamidoamine) which do not participate in crosslinking reactions for preparing the thermally-crosslinkable hydrophilic polymeric material.

An epichlorohydrin-functionalized polyamine or polyamidoamine can be obtained by reacting epichlorohydrin with a polyamine polymer or a polymer containing primary or secondary amino groups. For example, a poly(alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer. Similarly, a homopolymer or copolymer of aminoalkyl(meth)acrylate, mono-alkylaminoalkyl(meth)acrylate, aminoalkyl(meth)acrylamide, or mono-alkylaminoalkyl(meth)acrylamide can also react with epichlorohydrin to form an epichlorohydrin-functionalized polyamine. The reaction conditions for epichlorohydrin-functionalization of a polyamine or polyamidoamine polymer are taught in EP1465931 (herein incorporated by reference in its entirety). A preferred epichlorohydrin-functionalized polymer is polyaminoamide-epichlorohydrin (PAE) (or polyamide-polyamine-epichlorohydrin or polyamide-epichlorohydrin), such as, for example, Kymene® or Polycup® resins (epichlorohydrin-functionalized adipic acid-diethylenetriamine copolymers) from Hercules or Polycup® or Servamine® resins from Servo/Delden.

Any suitable hydrophilicity-enhancing agents can be used in the invention so long as they contain at least one amino group, at least one carboxyl group, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of monomeric units having an amino (—NHR' with R' as defined above), carboxyl (—COOH) and/or thiol (—SH) group in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NSCO_2H$)—), or combinations thereof.

Another preferred class of hydrophilic polymers as hydrophilicity-enhancing agents include without limitation: poly(ethylene glycol) (PEG) with mono-amino, carboxyl or thiol group (e.g., PEG-NH$_2$, PEG-SH, PEG-COOH); H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino- or dicarboxyl-terminated homo- or co-polymer of a non-reactive hydrophilic vinylic monomer; a monoamino- or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer and/or at least one phosphorylcholine-containing vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acrylamide (AAm), N,N-dimethylacrylamide (DMA), N-vinylpyrrolidone (NVP), N-vinyl-N-methyl acetamide, glycerol(meth)acrylate, hydroxyethyl(meth)acrylate, N-hydroxyethyl(meth)acrylamide, $C_1$-$C_4$-alkoxy polyethylene glycol(meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl(meth)acrylate, N,N-dimethylaminopropyl(metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth)acrylic acid, $C_2$-$C_{12}$ alkylacrylic acid, vinylamine, allylamine, and/or amino-$C_2$-$C_4$ alkyl (meth)acrylate, and (2) (meth)acryloyloxyethyl phosphorylcholine and/or at least one non-reactive hydrophilic vinylic monomer selected from the group consisting of acrylamide, N,N-dimethylacrylamide, N-vinylpyrrolidone, N-vinyl-N-methyl acetamide, glycerol(meth)acrylate, hydroxyethyl(meth)acrylate, N-hydroxyethyl(meth)acrylamide, $C_1$-$C_4$-alkoxy polyethylene glycol(meth)acrylate having a weight average molecular weight of up to 400 Daltons, vinyl alcohol, and combination thereof.

Most preferably, the hydrophilicity-enhancing agent as a hydrophilicity-enhancing agent is PEG-NH$_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl(meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine]homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of a carboxylic acid containing vinylic monomer and/or an amino-containing vinylic monomer, and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

Copolymers comprising a non-reactive hydrophilic vinylic monomer and a reactive vinylic monomer (e.g., a carboxyl-containing vinylic monomer) can be prepared according to any well-known radical polymerization methods or obtained from commercial suppliers. Copolymers containing methacryloyloxyethyl phosphorylcholine and carboxyl-containing vinylic monomer can be obtained from NOP Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000.

In accordance with the invention, the reaction between a hydrophilicity-enhancing agent and an epichlorohydrin-functionalized polyamine or polyamidoamine is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to an epichlorohydrin-functionalized polyamine or polyamidoamine must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the epichlorohydrin-functionalized polyamine or polyamidoamine.

In accordance with the invention, heating is performed preferably by autoclaving a contact lens with the UV-absorbing coating thereon in a packaging solution (i.e., a buffered aqueous solution) including a water-soluble thermally crosslinkable hydrophilic polymeric material in a sealed lens package at a temperature of from about 118° C. to about 125° C. for approximately 20-90 minutes. In accordance with this embodiment of the invention, the packaging solution is a buffered aqueous solution which is ophthalmically safe after autoclave. Alternatively, is performed preferably by autoclaving a contact lens, which comprises a UV-absorbing coating and a layer of a water-soluble thermally crosslinkable hydrophilic polymeric material on top of the base coating, immersed in a packaging solution (i.e., a buffered aqueous solution) in a sealed lens package at a temperature of from about 118° C. to about 125° C. for approximately 20-90 minutes.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes) prior to dispensing to users. A person skilled in the art will understand well how to seal and sterilize lens packages.

In accordance with the invention, a packaging solution contains at least one buffering agent to maintain a pH of the packaging solution in a physiologically acceptable range of about 6 to about 8.5, one or more other tonicity agents to provide a tonicity of from about 200 to about 450 milliosmol (mOsm), preferably from about 250 to about 350 mOsm, and other ingredients known to a person skilled in the art. Examples of other ingredients include without limitation, surfactants/lubricants, antibacterial agents, preservatives, and/or water-soluble viscosity builders (e.g., cellulose derivatives, polyvinyl alcohol, polyvinylpyrrolidone).

Examples of physiologically compatible buffering agents are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N, N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

Suitable ocularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 20 centipoises, preferably from about 1.2 centipoises to about 10 centipoises, more preferably from about 1.5 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble and thermally-crosslinkable hydrophilic polymeric material of the invention.

Where at least one of the crosslinked coating and the packaging solution contains a polymeric material having polyethylene glycol segments, the packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, a α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, ophthalmically beneficial materials, and/or surfactants. Exemplary mucin-like materials described above, exemplary ophthalmically beneficial materials described above, exemplary surfactants described above can be used in this embodiment.

In a preferred embodiment, a method of the invention further comprises a step of dipping the contact lens in a solution of blue light-absorbing polymer having blue light-absorbing monomeric units and at least about 50%, preferably at least about 60%, more preferably at least about 70%, even more preferably at least about 80%, most preferably at least about 90%, by mole of carboxyl-containing monomeric units. The term "blue light-absorbing monomeric units" refers to repeating units of a polymer each of which comprises a blue light-absorbing moiety. A "blue light-absorbing moiety" refers to an organic group which can render a compound containing such group to absorb light in the region of from about 400 nm to about 480 nm. One preferred blue light-absorbing moiety is nitrophenylpyrrolidine group. A blue light absorbing polymer can be prepared according to procedures similar to those described above for UV-absorbing polymers. For example, a blue light-absorbing polymer can be prepared by polymerizing a polymerizable mixture comprising at least one carboxyl-containing vinylic monomer (any one of those described above) and at least one blue light-absorbing vinylic monomer, or alternatively by reacting a blue light-absorbing compound having a reactive functional group (e.g., amino group, azlactone group, epoxy group, isocyanate group, aziridine group, and combination thereof, with amino groups as most preferred reactive functional groups) with a precursor polymer (any one of those described above for preparing UV-absorbing polymers) containing carboxyl and optional amino groups.

In another preferred embodiment, a contact lens, preferably a silicone hydrogel contact lens obtained according to a method of the invention has a surface wettability characterized by having an averaged water contact angle of about 90 degrees or less, preferably about 80 degrees or less, more preferably about 70 degrees or less, even more preferably about 60 degrees or less, most preferably about 50 degrees or less.

It should be understood that although in this aspect of the invention various embodiments including preferred embodiments of the invention may be separately described above, they can be combined and/or used together in any desirable fashion to arrive at different embodiments of a contact lenses of the invention.

In another aspect, the invention provides an ophthalmic lenses, the lens comprising a polymeric lens body; a layer of UV-absorbing polymer on the lens body; and a hydrogel coating covalently attached onto the layer of the UV-absorbing polymer, wherein the UV-absorbing polymer comprises UV-absorbing monomeric units and at least about 50%, preferably at least about 60%, more preferably at least about 70%, even more preferably at least about 80%, most preferably at least about 90%, by mole of carboxyl-containing monomeric units, wherein the hydrogel coating is obtained by covalently attaching a hydrophilic polymer or polymeric material having reactive functional groups onto the layer of the UV-absorbing polymer through linkages each formed between one carboxylic group of the UV-absorbing coating and one reactive functional group of the hydrophilic polymer or polymeric material.

All of the various embodiments as described above for the previous aspect of the invention can be used, alone or in any combination, in this aspect of the invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

This example illustrates the preparation of an amino-functionalized UV-absorbing compound of the invention according to Michael addition as shown in the following Scheme 1.

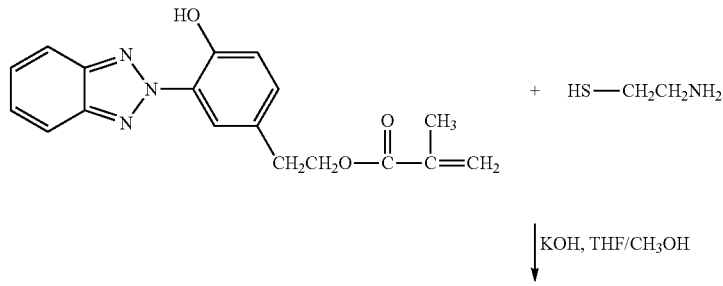

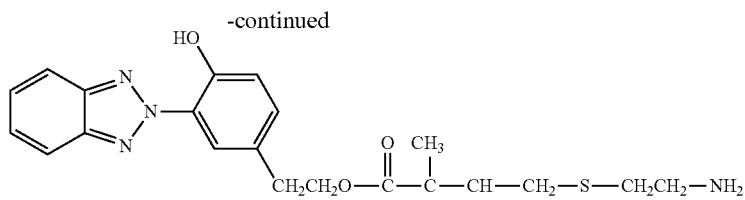

Preparation of Amino-Functionalized Norbloc.

Norbloc (i.e., 2-[3-(2H-Benzotriazol-2-yl)-4-hydroxyphenyl]ethyl methacrylate) is received from Aldrich (Cat#413437-100G). Cysteamine hydrochloride is received from Fluka (Cat #30078). 0.1N iodine aqueous solution is received from Acros (Cat #124220010).

In a 2 liter, three necked round bottom flask, 40.0 g (123.7 mmol) Norbloc is dissolved in 800 mL THF. In a separate flask, 15.46 g (136.1 mmol) of cysteamine hydrochloride is dissolve in 25 mL of methanol. Using an addition funnel, cysteamine HCl solution is added drop wise to reaction flask with stirring. Reaction mixture is purged under nitrogen during reaction time. Once addition is complete, reaction mixture is heated to 35° C. When reaction mixture reaches desired temperature, 0.25 mL of sample from the reaction mixture is withdrawn by syringe. Sample is placed in a 10 mL flask and diluted with 5 mL of 50/50 isopropanol/toluene, acidified with dilute acetic acid and then titrated with 0.1N iodine aqueous solution to determine starting thiol content of reaction. Using addition funnel, 85 mL of 2N potassium hydroxide solution is added to reaction mixture to make it basic. Reaction mixture is allowed to mix at 35° C. under nitrogen. Progress of reaction is monitored by repeating iodine titrations to determine when all of the available thiol has been consumed. Reaction may take up to 65 hours for complete thiol consumption. Once thiol consumption is complete, reaction mixture is cooled to room temperature and transferred to 4 liter separatory funnel. 400 mL of THF is added to the funnel. Reaction mixture is extracted with 1 L of brine for 2 times. Aqueous phase is discarded and organic phase is dried over magnesium sulfate. Solution is filtered and solvent is removed on a rotary evaporator. Resulting product is a clear, viscous, fluorescent-yellow liquid. Yield of the reaction is about 54.0 grams (90%).

Characterization

Amino-functionalized Norbloc (the product) is characterized by $^1$H-NMR; comparison of spectra between product and starting material shows the disappearance of the methacrylate protons at 5.5 and 6.1 ppm. Functionality of product is also determined by amino-group titration; results show amino-functionality at 2.21 meq/g (theoretical 2.5 meq/g). Purity of product is also determined by HPLC analysis; amino-functionalized Norbloc has shorter retention time than that of the methacrylate starting material, Norbloc, at a detection wavelength of 335 nm. Typical purity of product, by HPLC analysis, is between 85-95% amino-functional material, with the Norbloc (starting material) as the major impurity.

UV spectra of Norbloc and amine functionalized Norbloc show that Michael Addition reaction does not affect significantly the UV-absorption characteristic of Norbloc.

A repeat synthesis is conducted to display reproducibility of the synthesis along with a slight scale-up. The repeat product is confirmed as identical to the previously synthesized product.

Example 2

Preparation of PDMS Crosslinker I

In a 4-L beaker, 24.13 g of $Na_2CO_3$, 80 g of NaCl and 1.52 kg of deionized water are mixed to dissolve. In a separate 4-L beaker, 700 g of bis-3-aminopropyl-polydimethylsiloxane (Shin-Etsu, MW ca. 11500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 14.5 g of acryloyl chloride are dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered with a filter of 1.0 μm size exclusion, and concentrated on a rotary evaporator. The resulting oil is further purified by high-vacuum drying to constant weight. Analysis of the resulting product by titration reveals 0.175 mEq/g of C═C double bonds.

Preparation of PDMS Crosslinker II

In a 4-L beaker, 61.73 g of $Na_2CO_3$, 80 g of NaCl and 1.52 kg of deionized water are mixed to dissolve. In a separate 4-L beaker, 700 g of bis-3-aminopropyl-polydimethylsiloaxane (Shin-Etsu, MW ca. 4500) are dissolved in 1000 g of hexane. A 4-L reactor is equipped with overhead stirring with turbine agitator and a 250-mL addition funnel with micro-flow controller. The two solutions are then charged to the reactor, and mixed for 15 minutes with heavy agitation to produce an emulsion. 36.6 g of acryloyl chloride is dissolved in 100 mL of hexane and charged to the addition funnel. The acryloyl chloride solution is added dropwise to the emulsion under heavy agitation over one hour. The emulsion is stirred for 30 minutes on completion of the addition and then agitation is stopped and the phases are allowed to separate overnight. The aqueous phase is decanted and the organic phase is washed twice with a mixture of 2.0 kg of 2.5% NaCl dissolved in water. The organic phase is then dried over magnesium sulfate, filtered to 1.0 μm exclusion, and concentrated on a rotary evaporator. The resulting oil is further purified by high-vacuum drying to constant weight. Analysis of the resulting product by titration reveals 0.435 mEq/g of C═C double bonds.

Preparation of the Crosslinkable Copolymer

A 2-L jacketed reactor is equipped with a heating/chilling loop, reflux condenser, $N_2$-inlet/vacuum adapter, feeding tube adapter and overhead mechanical stirring. A solution is generated by dissolving 90.00 g of PDMS crosslinker I prepared above and 30.00 g of PDMS crosslinker II prepared above in 480 g of 1-propanol. This solution is charged to the reactor and cooled to 8° C. The solution is degassed by evacuating to less than 15 mBar, holding at vacuum for 15 minutes, and then re-pressurizing with dry nitrogen. This degas procedure is repeated for a total of 3 times. The reactor is held under a blanket of dry nitrogen.

In a separate flask, a monomer solution is prepared by mixing 1.50 g of cysteamine hydrochloride, 0.3 g of AIBN (2-2-Azoiso bisbutyronitrile), 55.275 g of DMA (N,N-dimethylacrylamide), 18.43 g of HEA (hydroxyethyl acrylate) and 364.5 g of 1-propanol. This solution is filtered with a Waterman 540 filter paper, and then added to the reactor through a degas unit and HPLC pump with a flow rate of 3.0 mL/minute. The reaction temperature is then elevated to 68° C. with a heating ramp about one hour.

In a second flask, a feeding solution is prepared by mixing 4.5 g of cysteamine hydrochloride and 395.5 g of 1-propanol and then filtering with Waterman 540 filter paper. When the reactor temperature reaches 68° C., this solution is slowly dosed into the reactor through the degasser/HPLC pump over 3 hours. The reaction is then continued at 68° C. for an additional 3 hours, on which heating has discontinued and the reactor is allowed to cool to room temperature.

The reaction mixture is transferred to a flask and stripped solvent at 40° C. under vacuum on a rotary evaporator until 1000 g of sample remained. The solution is then slowly mixed with 2000 g of deionized water with rapid agitation. Additional solvent is further removed until about 2000 g of sample remain. During this stripping process, the solution gradually becomes an emulsion. The resulting material is purified by ultrafiltration over a 10 kD molecular weight cut-off membrane until the permeate conductance is below 2.5 μS/cm.

This emulsion is then charged to a 2-L reactor equipped with overhead stirring, refrigeration loop, thermometer, and the pH meter and dispensing tip of a Metrohm Model 718 STAT Titrino. The reaction mixture is then cooled to 1° C. 7.99 g of NaHCO$_3$ are charged to the emulsion and stirred to dissolve. The Titrino is set to maintain pH at 9.5 by intermittent addition of 15% sodium hydroxide solution. 11.59 mL of acryloyl chloride are then added over one hour using a syringe pump. The emulsion is stirred for another hour, then the Titrino is set to neutralize the reaction mixture by addition of a 15% solution of HCl. The product is purified by ultrafiltration again with 10 kD molecular weight cut-off membrane until the permeate conductance is below 2.5 μS/cm. The final macromonomer is isolated by lyophilization.

Preparation of Contact Lenses 18.83 g of the crosslinkable copolymer prepared above are dissolved in approximately 200 mL of 1-propanol, concentrated to ca. 70 g total solution weight, and filtered to 0.45 μm exclusion. 67.94 g of solution at 26.53% solids are recovered. 4.503 g of a 1% solution of 2-hydroxy-4'-hydroxyethyl-2-methylpropiophenone (IRGACURE®-2959, Ciba Specialty Chemicals) are added, and the solution is then concentrated to a final formulation having 60% solids. 200 mg of the formulation are dosed into poly(propylene) contact lens molds and the molds are closed. The molds are then irradiated for 15 seconds with an ultraviolet light source having an intensity of 2.18 mW/cm$^2$. The molds are then opened, and the contact lenses are removed from the mold halves.

Example 3

This example illustrates a method of the invention by using a fluorescein-modified polyacrylic acid of formula (1) (in which m:n∼160:1), designated as PAA-F50.

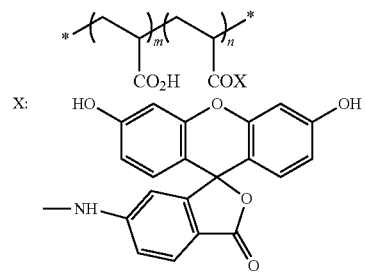

Preparations of PAA-F50

1H-NMR spectroscopic investigations are performed with a Bruker Avance 400 NMR spectrometer. For UV-Vis spectroscopic studies a Perkin Elmer Lambda 25 spectrometer is utilized.

PAA-F50 has a molecular weight of about 50 kD and comprises about 0.6% by mole of monomeric units having one fluorescin moiety. It is prepared as follows.

Into a 250 ml three-neck flask, equipped with a N2-inlet tube, a condenser and a magnetic bar 5.0 g of solid Polyacrylic acid (PAA, Mw 50.000, freeze-dried product from the PAA solution of Polysciences #00627-250) are placed and dissolved in 150 ml of N,N-Dimethylformamid, DMF (Aldrich #227056) by stirring at ambient temperature. To this solution 2.68 g of N-(3-Dimethylaminopropyl)-N'-ethylcarbodiimide hydrochloride (14 mmol; EDC-HCl; Fluka #03449) are added and stirred as long as the turbid solution becomes clear. To this mixture are added slowly 4.86 g of 6-Aminofluoresceine (14 mmol; Aldrich #201634) dissolved in 20 ml DMF. After 6 days stirring, the reaction mixture is poured in 1 L de-ionized water. The pH of this solution is adjusted to pH=7.0 with a 1N NaOH solution (Merck #1.09137, 1000), ultra filtrated (10 kDa membrane, Millipore #P2C010V01; 15× volume exchange by water) against de-ionized water and concentrated (approx. 300 ml). After freeze-drying of the solution 7.1 g of a deep-orange, solid product is isolated.

UV-Vis (PBS solution at pH 7.0): Maxima $\epsilon_1$ (321 nm)=0.88 and $\epsilon_2$ (491 nm)=6.37 [l/(g×cm)].

The mole percent of fluorescein-containing monomeric units in polymer PAA-F50 ($X_{Fluoresceine}$) is 0.6 [Mol-%]. It is determined by UV-Vis spectroscopy in a PBS buffered solution (pH=7.0) according to equation $$X_{Fluoresceine}=100\times A\times M_A/[w\times\epsilon_F(491\ nm)\times d+A\times(M_A-M_F)][Mol\text{-}\%] \quad (1)$$

In which w [g/L] is the concentration of PAA-F50 in the solution; $M_A$ (72 g/mol) and $M_F$ (419 g/mol) are the molar masses of the repeating monomeric units, acrylic acid and fluorescein-modified acrylic acid (i.e., 6-acryloylamido-fluorescein), in the copolymer PAA-F50, respectively. A is the corresponding UV absorbance at 491 nm; $\epsilon_F$ (491 nm) is the coefficient of absorbance of the fluoresceine moiety in the copolymer at a wave length of 491 nm: it was assumed that this is equal with that of 6-Aminofluoresceine ($\epsilon_{AF}$ (491 nm)=76290 [l/mol×cm)]; d is the width of the UV measuring cuvette.

Preparation of PAA-F50 Coated Contact Lens

Figure 2:
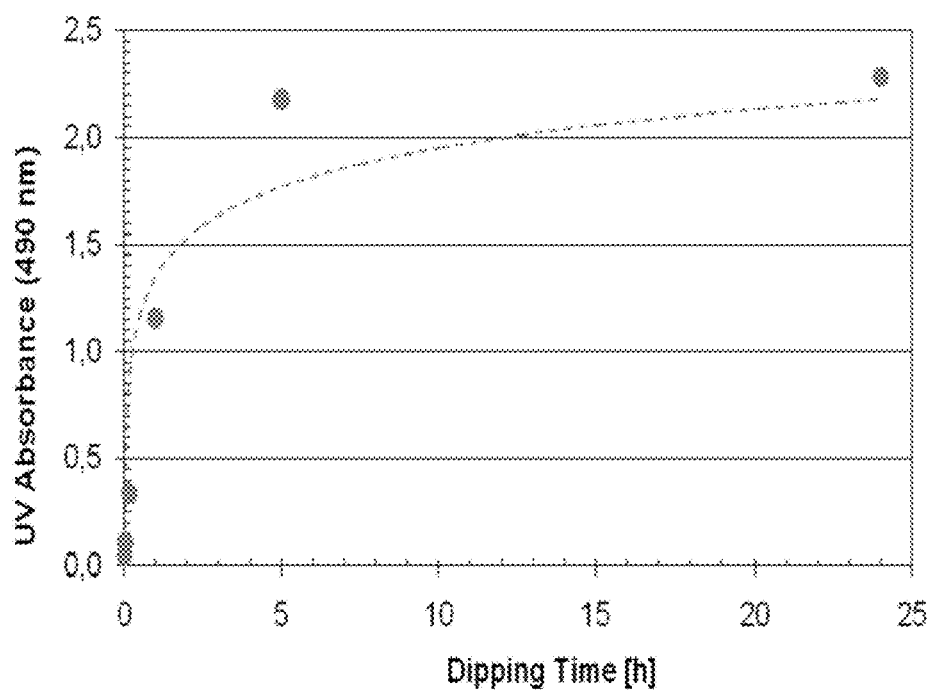
FIG. 2 shows the UV-Vis absorbance at 490 nm of silicone hydrogel contact lenses with coatings thereon as function of dipping time for obtaining the coatings.

After transferring a contact lens as prepared in Example 2 from a water bath into a bath containing a solution of PAA-F50 (dissolved in 1-propanol, pH adjusted with HCOOH to about 2.0; 0.36 g/l PAA-F50, labelling degree: 0.59 Mol-%), the PAA-F50 continuously diffuses into the lens. This diffusion of PAA-F50 into the lens is reflected by a colorization of the lenses, whereas the intensity of the lens colour increases with increasing treatment time (see FIG. 1). The diffusion and increasing colorization can also be monitored by UV-VIS spectroscopy. The absorbance at 490 nm, belonging to the Fluorescence moiety on PAA-F50, increases with time (see FIG. 2). The formation of PAA-F50 coating on the lens is demonstrated by first dipping a contact lens in the PAA-F50 solution (prepared above) for about one hour and then transferring and storing the PAA-F50 coated lens in an aqueous phosphate buffered saline (PBS) solution. The buffered solution remains almost colourless even after several weeks of storage.

Example 4

This example illustrates how to prepare a contact lens with a UV-absorbing coating thereon according to a preferred embodiment of the invention.

Preparation of Poly(Acrylic Acid-co-Norbloc) (PAA-N20)

1H-NMR spectroscopic investigations are performed with a Bruker Avance 400 NMR spectrometer. For UV-Vis spectroscopic studies a Perkin Elmer Lambda 25 spectrometer is utilized. Acrylic acid is supplied from Fluka (#017309111).

A UV-absorbing polymer of formula (2) (in which m:n~80:20), designated as PAA-N20, has a molecular weight of about 36 kD and comprises about 8.1% by mole of UV-absorbing monomeric units (Norbloc, [3-(2-H-Benzotriazol-2-yl)-4-hydroxyphenyl]ethyl methacrylate). It is prepared according to the procedures described below.

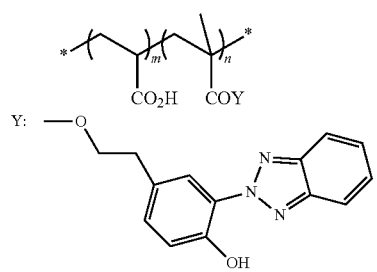

2

Into a 250 ml three-neck flask equipped with a N2-inlet tube, a condenser, a thermometer and a magnetic bar are placed a mixture of 8.00 g acrylic acid (111 mmol; Fluka #017309111), 2.00 g ([3-(2-H-Benzotriazol-2-yl)-4-hydroxyphenyl]ethyl methacrylate (Norbloc 7966; 6.2 mmol; Aldrich #22,-705-6) and 100 ml of N,N-Dimethylformamid (DMF; Aldrich, #227056). Through this solution Nitrogen is conducted in order to free the solution from air. Then it is heated up to 60° C. while stirring and 0.5 ml of a DMF solution with 4% of Dimethyl-2,2'-azobis-isobutyrate (V-601, Wako #927-14717) is added. The reaction mixture is kept at 60° C. by stirring over a period of 16 h, cooled down to ambient temperature and poured into 1.0 L of ethyl acetate. The resulting precipitate is separated by centrifugation (6000 min$^{-1}$, 30 min), re-dissolved in a slightly basic aqueous solution (pH=10.0, adjusted with sodium carbonate) and ultrafiltrated (3 kDa membrane, Millipore #P2PLBCV01; 15× volume exchange by water) against de-ionized water. After freeze-drying of the solution 7.0 g of a white, solid product is isolated.

1H-NMR (400 MHz; D2O) δ: 0.8-3.15 (maxima at 1.06, 1.52, 1.62, 2.15, 2.57), 4.25, 6.5-8.1 ($H_{aromatic}$) ppm; all signals are unstructured and broad.

The mole percentage of Norbloc monomeric units in copolymer PAA-N20 is $X_{Norbloc}$=8.1 [Mol-%], based on 1H-NMR integration according to the following equation $$X_{Norbloc}[Mol-\%]=100\times[3\times A_{aromatic}/(7\times A_1-4\times A_{aromatic})]$$

in which $A_1$ is the integral of the area of the protons between 1.02-3.15 ppm and $A_{aromatic}$ is the integral of the area of the aromatic signals between 6.5-8.15 ppm.

UV-Vis absorbance (PBS solution at pH 7.0): Two maxima with absorption coefficients $\epsilon_1$ (299 nm)=9.09 and $\epsilon_2$ (329 nm)=8.86[l/(g×cm)].

Molecular weight by GPC (PSS Suprema columns with 30 Å and 1000 Å pore size; PBS solution as eluent; Na-Poly (acrylic acid) as calibration standards): Mw=36 kDa.

Preparation of a PAA-N20 Coated Contact Lens

Figure 3:
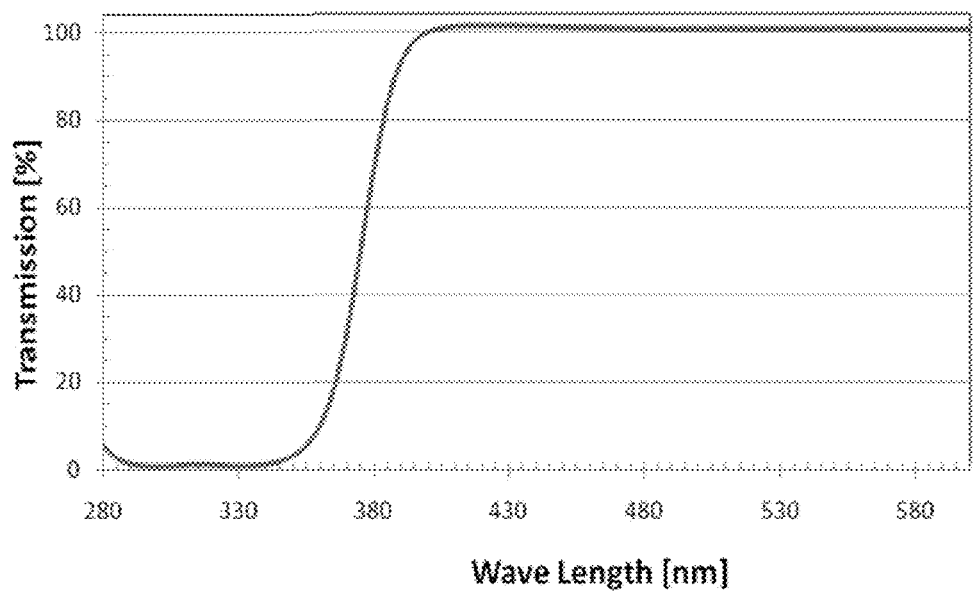
FIG. 3 shows the UV-Vis transmission spectrum of a silicone hydrogel contact lens with a UV-absorbing coating thereon.

A contact lens prepared in Example 2 is dipped in a solution of PAA-N20 (0.36 g/L PAA-N20 dissolved in 1-propanol, pH adjusted with HCOOH to about 2.0) for about 30 minutes and then rinsed with and stored in an aqueous phosphate buffered saline (PBS) solution. The UV spectrum of the resultant contact lens with PAA-N20 coating thereon clearly shows that the light transmission of the lens is efficiently blocked in the UV-B- and UV-A region (i.e. the region between 280 nm and 380 nm) (see FIG. 3).

Example 5

Preparation of Poly[acrylic acid-co-methacryoyloxymethyl-1-(4-nitrophenyl)pyrrollidin) (PAA-L20) a blue-light absorber A blue light-absorbing polymer of formula (3), designated as PAA-L20, has a molecular weight of about XX kD and comprises about 12.3% by mole of blue-light-absorbing monomeric units ((S)-2-methacryloyloxymethyl-1-(4-nitrophenyl)pyrrolidine). It is prepared according to the procedures described below.

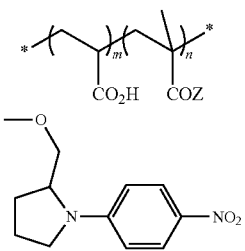

3

Into a 100 ml three-neck flask, equipped with a N2-inlet tube, a condenser, a thermometer and a magnetic bar are placed a mixture of 2.0 acrylic acid (28 mmol, Fluka #017309111), 0.5 g (S)-2-methacryloyloxymethyl-1-(4-nitrophenyl)pyrrolidine (1.6 mmol; prepared according to M. Yoshida et. al., *Makromol. Chem. Rapid Commun.*, 10, (1989), 517) and 20 ml N,N-Dimethylformamid (DMF, Aldrich #227056). Through this solution Nitrogen is conducted in order to free the solution from air. Then it is heated up to 60° C. by stirring and 0.5 ml of a DMF solution with 1% of Dimethyl-2,2'-azobis-isobutyrate (V-601, Wako #927-14717) is added. The reaction mixture is kept by stirring at 60° C. over period of 6 hours, cooled down to ambient temperature and poured into 500 ml of ethyl acetate. The resulting precipitate is separated by centrifugation (6000 min$^{-1}$, 30 min), re-dissolved in a slightly basic aqueous solution (pH=10.0, adjusted with sodium carbonate) and ultrafiltrated (3 kDa membrane, Millipore #P2PLBCV01; 15× volume exchange by water) against de-ionized water. After freeze-drying of the solution 1.1 g of a deep-yellow solid product is isolated.

1H-NMR (400 MHz; D2O) δ: 1.0-2.8 (maxima at 1.24, 1.67, 1.80, 2.26), 3.15-4.15 (maxima at 3.49, 3.79, 4.27), 6.4-7.0 ($H_{aromatic}$), 7.7-8.4 ($H_{aromatic}$) ppm; all signals are unstructured and broad.

The mole percent of 4-nitrophenyl pyrrolidine-containing monomeric units, i.e. the blue-light absorbing monomeric units ($X_{Blue}$) in copolymer PAA-L20 is $X_{Blue}$=12.3 [Mol-%], calculated by 1H-NMR integration according to the following equation $$X_{Blue}[\text{Mol-\%}] = 100 \times [3 \times A_2/(2 \times A_1 - 6 \times A_2)]$$

in which $A_1$ is the integral of the area of the protons between 1.0-2.8 ppm and $A_2$ is the integral of the area of the aromatic signals between 7.7-8.4 ppm.

UV-Vis absorbance (PBS solution at pH 7.0): Two maxima with absorption coefficients $\epsilon_1$ (235 nm)=6.6 and $\epsilon_2$ (417 nm)=15.3 [l/(g×cm)].

Molecular weight by GPC (PSS Suprema columns with 30 Å, 300 Å, S2 and 1000 Å pore size; PBS solution as eluent; Na-Poly (acrylic acid) as calibration standards): Mw=36 kDa.

Example 6

Preparation of Chain Extended Polydimethylsiloxane Crosslinker

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternatively, CE-PDMS can be prepared as follows. 240.43 g of KF-6001 is added into a 1-L reactor equipped with stirring, thermometer, cryostat, dropping funnel, and nitrogen/vacuum inlet adapter, and then dried by application of high vacuum (2×10⁻² mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

Preparation of Lens Formulations.

A lens formulation is prepared by dissolving components in 1-propanol to have the following composition: about 32% by weight of CE-PDMS macromer prepared above, about 21% by weight of TRIS-Am, about 23% by weight of DMA, about 0.6% by weight of L-PEG (N-(carbonyl-methoxypolyethylene glycol-2000)-1,2-disteaoyl-sn-glycero-3-phosphoethanolamin, sodium salt), about 1% by weight of Darocur 1173, about 0.1% by weight of visitint (5% copper phthalocyanine blue pigment dispersion in TRIS), about 0.8% by weight of DMPC (1,2-dimyristoyl-sn-glycero-3-phosphocholine), about 200 ppm H-tempo (4-hydroxy-2,2,6,6-tetramethyl-1-piperidinyloxy), and about 22% by weight of 1-propanol.

Preparation of Lenses.

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm²) for about 24 seconds. Molded lenses are extracted with MEK.

Figure 4:
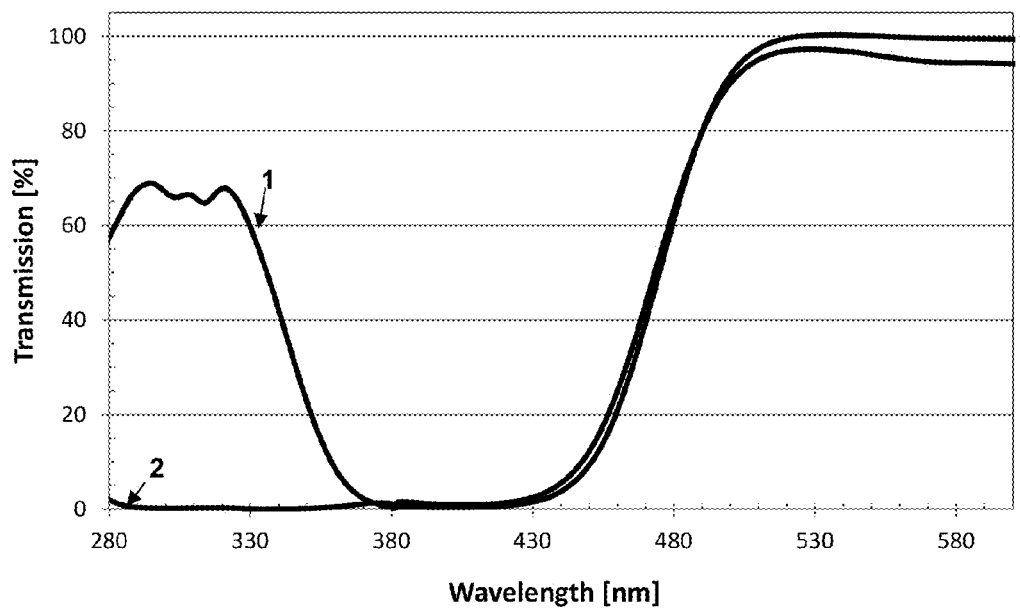
FIG. 4 shows the UV-Vis transmission spectra of silicone hydrogel contact lenses with different coatings thereon. 1: with PAA-L20 coating (dipping in PAA-L20 solution for about minutes); with PAA-N20 and PAA-L20 coating (dipping in the PAA-N20 solution and then in the PAA-L20 solution respectively for about 20 minutes).

Preparation of a Contact Lens with UV-Absorbing and Blue-Light-Absorbing Coating A contact lens prepared above is dipped in a bath containing a PAA-N20 solution (3.6 g/L of PAA-N20 dissolved in 1-propanol, adjusted to pH~2.0 with HCOOH) for about 20 minutes, rinsed with 1-propanol and subsequently dipped in a bath with a PAA-L20 solution (3.6 g/L PAA-L20, adjusted to pH~2.0 with HCOOH). FIG. 4 shows that the obtained contact lens absorbs the UV light not only in the range between 280-380 nm, but also in the range between 380-480 nm, i.e. beside the criteria for a lens with UV absorber class 1 properties. It also fulfills the properties of a blue-light absorbing lens.

What is claimed:
1. A method for producing UV-absorbing contact lenses, comprising the steps of:
 obtaining an ophthalmic lens;
 dipping the ophthalmic lens in a coating solution, which comprises a first organic solvent and a UV-absorbing polymer dissolved in the first organic solvent, for a period of time sufficient to form a UV-absorbing coating on the ophthalmic lens, wherein the UV-absorbing polymer comprises UV-absorbing monomeric units and at least 50% by mole of carboxyl-containing monomeric units, wherein the UV-absorbing polymer is obtained by reacting a UV-absorbing compound with a precursor polymer having at least 50% by mole of carboxyl-containing monomeric units in a coupling reaction, wherein the UV-absorbing compound is represented by formula I, II, III, or IV

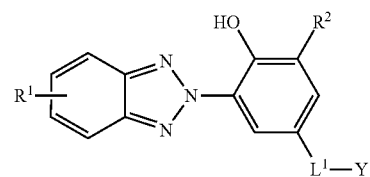

I

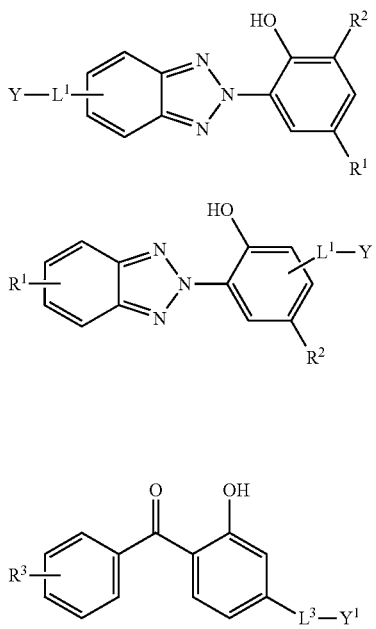

in which $R^1$, $R^2$ and $R^3$ independently of one another are hydrogen, a $C_1$-$C_{12}$ linear or branched alkyl group, a halogen, a $C_6$ to $C_{24}$ aryl group, a $C_7$ to $C_{24}$ alkylaryl group, a $C_7$ to $C_{24}$ arylalkyl, or a $C_1$-$C_{12}$ linear or branched alkoxy group; $L^1$ and $L^3$ independent of each other are a covalent bond or a divalent radical of $-X_a$-$E_1$-$X_b$-$E_2$-$X_c-$ in which $X_a$ is a covalent bond, $-O-$, carbonyl

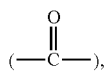, a divalent radical of $-(R^aO)_n-$ in which $R^a$ is a linear or branched $C_1$-$C_{12}$-alkylene and n is from 1 to 10,

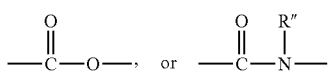

in which R" is H or $C_1$-$C_8$ alkyl, $E_1$ and $E_2$ independently of each other are a covalent bond, a divalent radical of $-(R^aO)_n-$ in which $R^a$ and n are defined above,

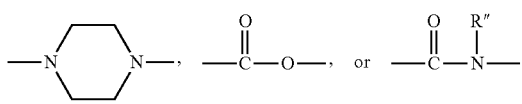

in which R" is H or $C_1$-$C_8$ alkyl, a $C_1$ to $C_{12}$ linear or branched alkylene divalent radical, a cycloalkyl divalent radical with up to 40 carbon atoms, an alkylcycloalkyl divalent radical with up to 40 carbon atoms, an alkylaryl divalent radical with up to 40 carbon atoms, an arylalkylene divalent radical with up to 40 carbon atoms, or a dicarbonyl group having the formula $-C(O)L^2C(O)-$ in which $L^2$ is a $C_1$ to $C_{12}$ linear or branched alkylene divalent radical or $-(R^{e1}-O)_{w1}-(R^{e2}-O)_{w2}-(R^{e3}-O)_{w3}-$, wherein $R^{e1}$, $R^{e2}$, and $R^{e3}$ independently of one another are a linear or branched $C_1$-$C_4$-alkylene and w1, w2 and w3 independently of one another are a number from 0 to 20 provided that the sum of (w1+w2+w3) is 1 to 60, and $X_b$ and $X_c$ independently of each other are a covalent bond, carbonyl,

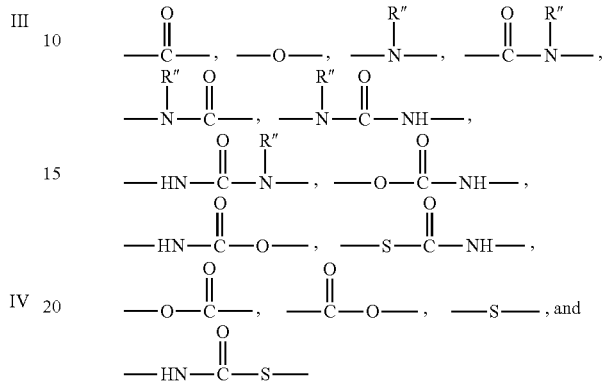

in which R" is defined above; and

Y and $Y^1$ independent of each other are an azlactone group, an epoxy group, an isocyanate group, an aziridine group, or an amino group of $-NHR$ in which R is hydrogen or a $C_1$-$C_{20}$ unsubstituted or substituted, linear or branched alkyl group; and optionally covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material.

2. The method of claim 1, wherein the precursor polymer is: (1) a homopolymer of acrylic acid or $C_1$-$C_{12}$ alkylacrylic acid; (2) a copolymer of acrylic acid and $C_1$-$C_{12}$ alkylacrylic acid; (3) a copolymer of a carboxyl-containing vinylic monomer and an amino-containing vinylic monomer, wherein the carboxyl-containing vinylic monomer is acrylic acid or $C_1$-$C_{12}$ alkylacrylic or combination thereof, wherein the amino-containing vinylic monomer is selected from the group consisting of amino-$C_2$-$C_6$ alkyl(meth)acrylate, $C_1$-$C_6$ alkylamino-$C_2$-$C_6$ alkyl(meth)acrylate, allylamine, vinylamine, amino-$C_2$-$C_6$ alkyl(meth)acrylamide, $C_1$-$C_6$ alkylamino-$C_2$-$C_6$ alkyl(meth)acrylamide), and combination thereof; or (4) a copolymer of a carboxyl-containing vinylic monomer and one or more hydrophilic vinylic monomers, wherein the carboxyl-containing vinylic monomer is acrylic acid or $C_1$-$C_{12}$ alkylacrylic or combination thereof, wherein said one or more hydrophilic vinylic monomers are free of carboxyl or amino group and selected from the group consisting of acrylamide (AAm), methacrylamide N,N-dimethylacrylamide (DMA), N,N-dimethyl methacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropyl methacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2- pyrrolidone, 5-methyl-3-methylene-2-pyrrolidone, 5-ethyl-3-methylene-2-pyrrolidone, 2-hydroxyethyl(meth)acrylate, hydroxypropyl(meth)acrylate, $C_1$-$C_4$-alkoxy polyethylene glycol(meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

3. The method of claim 1, wherein the precursor polymer is polyacrylic acid, polymethacrylic acid, poly($C_2$-$C_{12}$ alkylacrylic acid), poly(acrylic acid-co-methacrylic acid), poly[$C_2$-$C_{12}$ alkylacrylic acid-co-(meth)acrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinyl pyrrolidone], hydrolyzed poly[(meth)acrylic acid-co-vinylacetate], hydrolyzed poly[$C_2$-$C_{12}$ alkylacrylic acid-co-vinylacetate], or combinations thereof.

4. The method of claim 1, further comprising a step of rinsing the ophthalmic lens having the UV-absorbing coating thereon with a mixture of water and at most 50% by weight of a second organic solvent, wherein the first organic solvent is present in an amount of at least 60% by weight in the coating solution.

5. The method of claim 4, wherein the method comprises a step of covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material.

6. The method of claim 5, wherein the reactive functional groups of the hydrophilic polymer and hydrophilic polymeric material are azetidinium groups, epoxy groups, isocyanate groups, aziridine groups, azlactone groups, amino groups, carboxyl groups, and combinations thereof.

7. The method of claim 5, wherein the hydrogel coating is formed by crosslinking a partially-crosslinked polymeric material onto the UV-absorbing coating, wherein the partially-crosslinked polymeric material is water-soluble and comprises a three-dimensional network and reactive functional groups selected from the group consisting of azetidinium groups, epoxy groups, isocyanate groups, aziridine groups, azlactone groups, amino groups, carboxyl groups, and combinations thereof.

8. The method of claim 7, wherein the partially-crosslinked polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains.

9. The method of claim 8, wherein the step of covalently attaching the hydrophilic polymeric material is performed by autoclaving the contact lens with the UV-absorbing coating thereon in a packaging solution including the partially-crosslinked polymeric material in a sealed lens package at a temperature of from about 118° C. to about 125° C. for approximately 20-90 minutes.

10. The method of claim 5, wherein the hydrophilic polymer or hydrophilic polymeric material for forming the hydrogel coating comprises UV-absorbing moieties.

11. The method of claim 5, wherein the UV-absorbing coating further comprises a blue light-absorbing polymer.

12. The method of claim 1, wherein the ophthalmic lens is a silicone hydrogel contact lens which has a surface wettability characterized by having an averaged water contact angle of about 90 degrees or less.

13. A method for producing UV-absorbing contact lenses, comprising the steps of:
obtaining an ophthalmic lens;
dipping the ophthalmic lens in a coating solution, which comprises a first organic solvent and a UV-absorbing polymer dissolved in the first organic solvent, for a period of time sufficient to form a UV-absorbing coating on the ophthalmic lens, wherein the UV-absorbing polymer comprises UV-absorbing monomeric units and at least 50% by mole of carboxyl-containing monomeric units, wherein the first organic solvent is present in an amount of at least 60% by weight in the coating solution;
rinsing the ophthalmic lens having the UV-absorbing coating thereon with a mixture of water and at most 50% by weight of a second organic solvent; and
covalently attaching a hydrophilic polymer or polymeric material having reactive functional groups onto the UV-absorbing coating to form a hydrogel coating, wherein the hydrogel coating is covalently attached onto the UV-absorbing coating through linkages each formed between one carboxylic group of the UV-absorbing coating and one reactive functional group of the hydrophilic polymer or polymeric material.

14. The method of claim 13, wherein each UV-absorbing monomeric unit comprises a benzotriazole or benzophenone moiety.

15. The method of claim 14, wherein the UV-absorbing polymer is obtained by copolymerizing a polymerizable mixture comprising at least one carboxyl-containing vinylic monomer and at least one UV-absorbing vinylic monomer in the presence or absence of a vinylic monomer, provided that the carboxyl-containing vinylic monomer is present in an amount of at least 50% by mole in the polymerizable composition.

16. The method of claim 15, wherein the UV-absorbing vinylic monomer is selected from the group consisting of 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazo le, 2-(2'-hydroxy-5'-methacryloxyethylphenyl) benzotriazole, 2-(2'-hydroxy-5'-methacryloxypropylphenyl) benzotriazole, 2-hydroxy-4-acryloxy alkoxy benzophenone, 2-hydroxy-4-methacryloxy alkoxy benzophenone, allyl-2-hydroxybenzophenone, and 2-hydroxy-4-methacryloxy benzophenone, and combinations thereof; wherein the carboxyl-containing vinylic monomer is selected from the group consisting of acrylic acid, $C_1$-$C_{12}$ alkylacrylic acid, N,N-2-acrylamidoglycolic acid, beta-methyl-acrylic acid (crotonic acid), alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof.

17. The method of claim 13, wherein the reactive functional groups of the hydrophilic polymer and hydrophilic polymeric material are azetidinium groups, epoxy groups, isocyanate groups, aziridine groups, azlactone groups, amino groups, carboxyl groups, and combinations thereof.

18. The method of claim 13, wherein the hydrogel coating is formed by crosslinking a partially-crosslinked polymeric material onto the UV-absorbing coating, wherein the partially-crosslinked polymeric material is water-soluble and comprises a three-dimensional network and reactive functional groups selected from the group consisting of azetidinium groups, epoxy groups, isocyanate groups, aziridine groups, azlactone groups, amino groups, carboxyl groups, and combinations thereof.

19. The method of claim 18, wherein the partially-crosslinked polymeric material comprises (i) from about 20% to about 95% by weight of first polymer chains derived from an epichlorohydrin-functionalized polyamine or polyamidoamine, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the epichlorohydrin-functionalized polyamine or polyamidoamine and one amino, carboxyl or thiol group of the hydrophilicity-enhancing agent, and (iii) azetidinium groups which are parts of the first polymer chains or pendant or terminal groups covalently attached to the first polymer chains.

20. The method of claim 19, wherein the step of covalently attaching the hydrophilic polymeric material is performed by autoclaving the contact lens with the UV-absorbing coating thereon in a packaging solution including the partially-crosslinked polymeric material in a sealed lens package at a temperature of from about 118° C. to about 125° C. for approximately 20-90 minutes.

* * * * *